United States Patent [19]

Johnson et al.

[11] Patent Number: 4,563,286

[45] Date of Patent: Jan. 7, 1986

[54] SYSTEM OF IONIZED OXYGEN ALLOTROPE GAS WATER PURIFICATION AND METHOD AND APPARATUS THEREFOR

[76] Inventors: Dennis E. J. Johnson; Scott J. Johnson, both of 1025 Garfield Ave., Aurora, Ill. 60506

[21] Appl. No.: 678,635

[22] Filed: Dec. 6, 1984

Related U.S. Application Data

[63] Continuation-in-part of Ser. No. 599,626, Apr. 12, 1984, abandoned, which is a continuation of Ser. No. 403,801, Aug. 5, 1982, abandoned, which is a continuation-in-part of Ser. No. 363,254, Apr. 1, 1982, abandoned.

[51] Int. Cl.$^4$ .......................... B01J 19/12; C02F 1/72
[52] U.S. Cl. ...................... 210/721; 210/758; 210/760; 204/157.15; 422/186.01; 422/186.30
[58] Field of Search ................... 204/157.1 R, 155; 422/186.01, 186.30; 210/721, 758, 760

[56] References Cited

U.S. PATENT DOCUMENTS

| | | | |
|---|---|---|---|
| 3,186,929 | 6/1965 | Rippie | 204/155 |
| 4,179,616 | 12/1979 | Coviello et al. | 250/527 |
| 4,214,962 | 7/1980 | Pincon | 204/157.1 R |
| 4,229,389 | 10/1980 | Granger | 204/155 |
| 4,230,571 | 10/1980 | Dadd | 210/760 |
| 4,255,257 | 3/1981 | Greiner et al. | 210/709 |
| 4,338,199 | 7/1982 | Modell | 210/721 |

*Primary Examiner*—Howard S. Williams
*Attorney, Agent, or Firm*—McWilliams, Mann, Zummer and Sweeney

[57] ABSTRACT

A water purification arrangement which uses as the water treating agent ionized oxygen allotrope gas in multiple (multivalent) ion charge forms (as distinguished from common chemical treatment substances), in which the raw material for practicing the invention is ambient atmospheric air, and specifically its atmospheric oxygen content. The arrangement provided has a gas flow path having multivalent oxygen ion allotrope forming sites that each include a magnetic flux field energy zone within the ambient air flow path characterized by interacting multi-polar magnets that exert flux fields across the flow path, and one or more elongate oxygen photolysis lamps enveloping the flux with ultraviolet light wave length ionizing electronvolt radiant energy emissions. The ambient atmospheric air is passed in a continuous flow through the flow path and then is conveyed to and is interspersed in the water to be treated in a continuous flow application.

24 Claims, 22 Drawing Figures

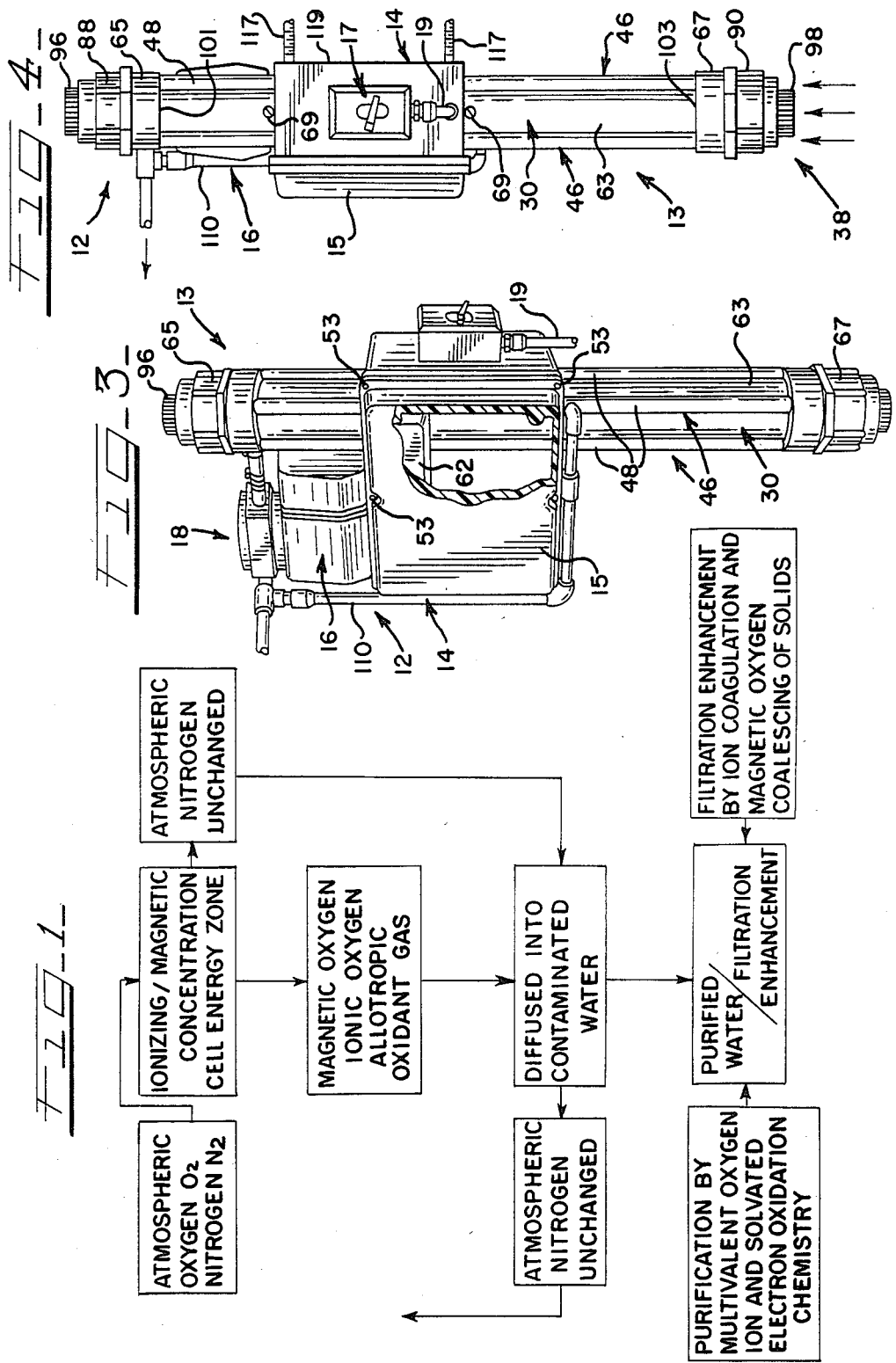

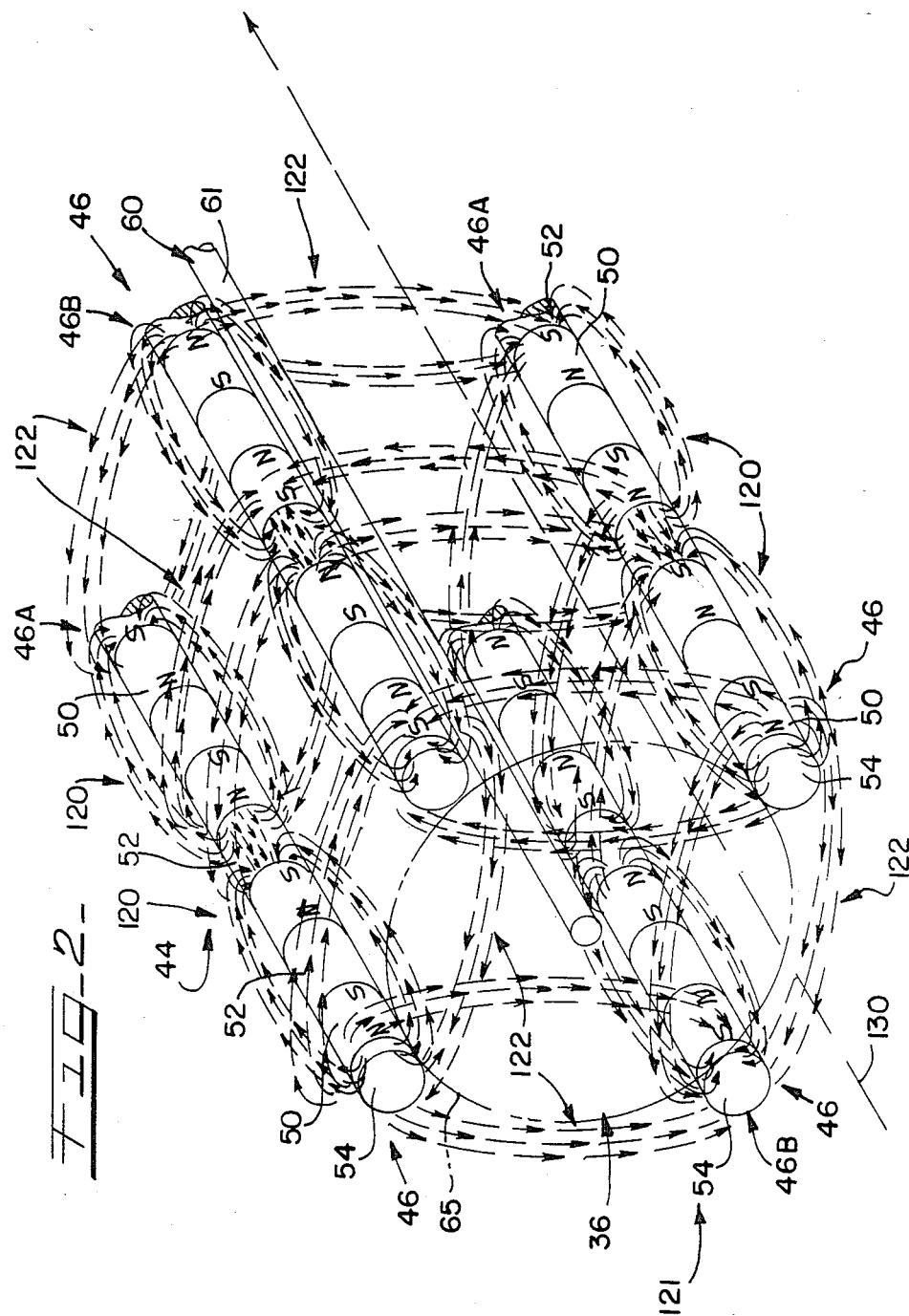

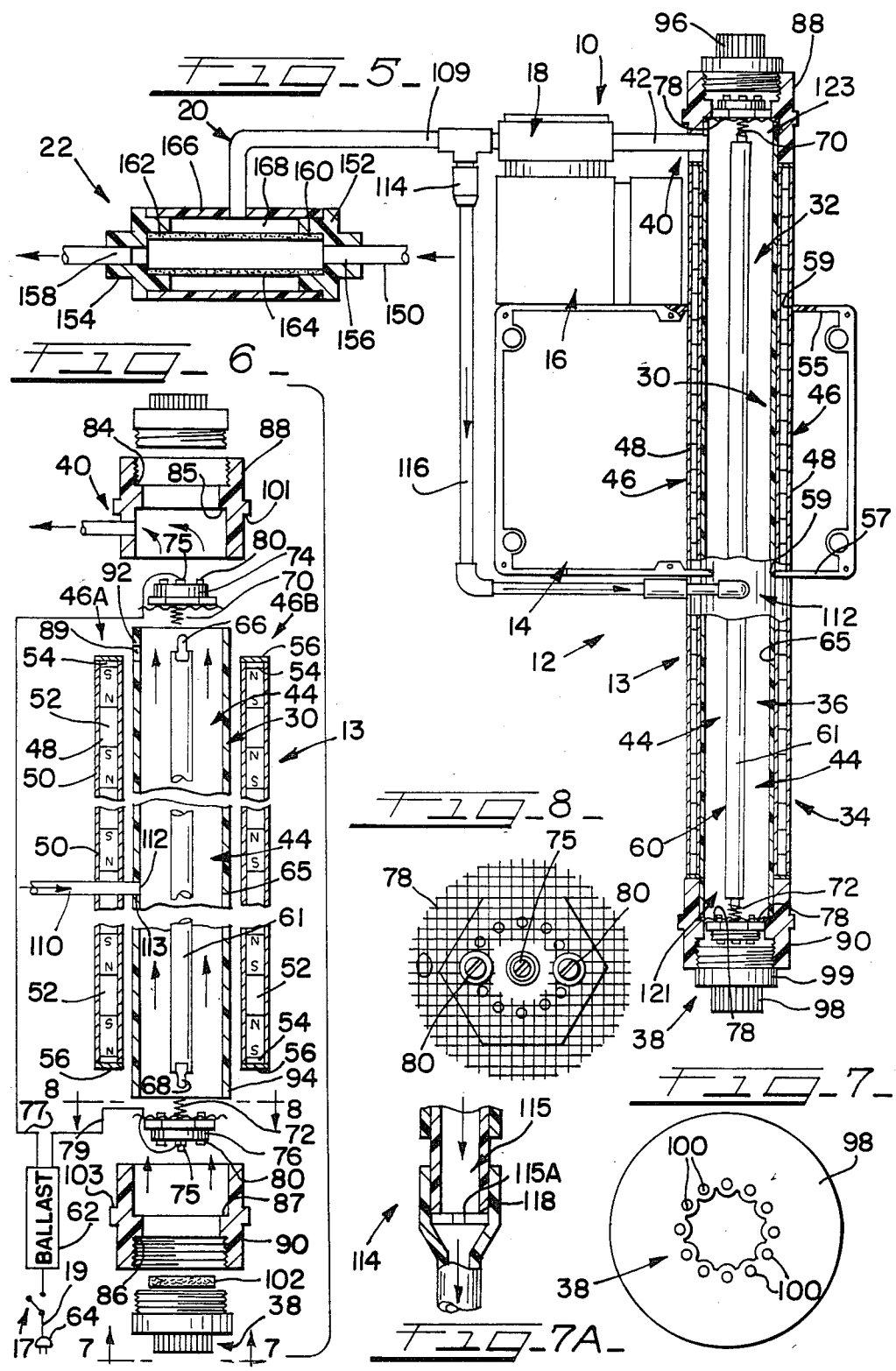

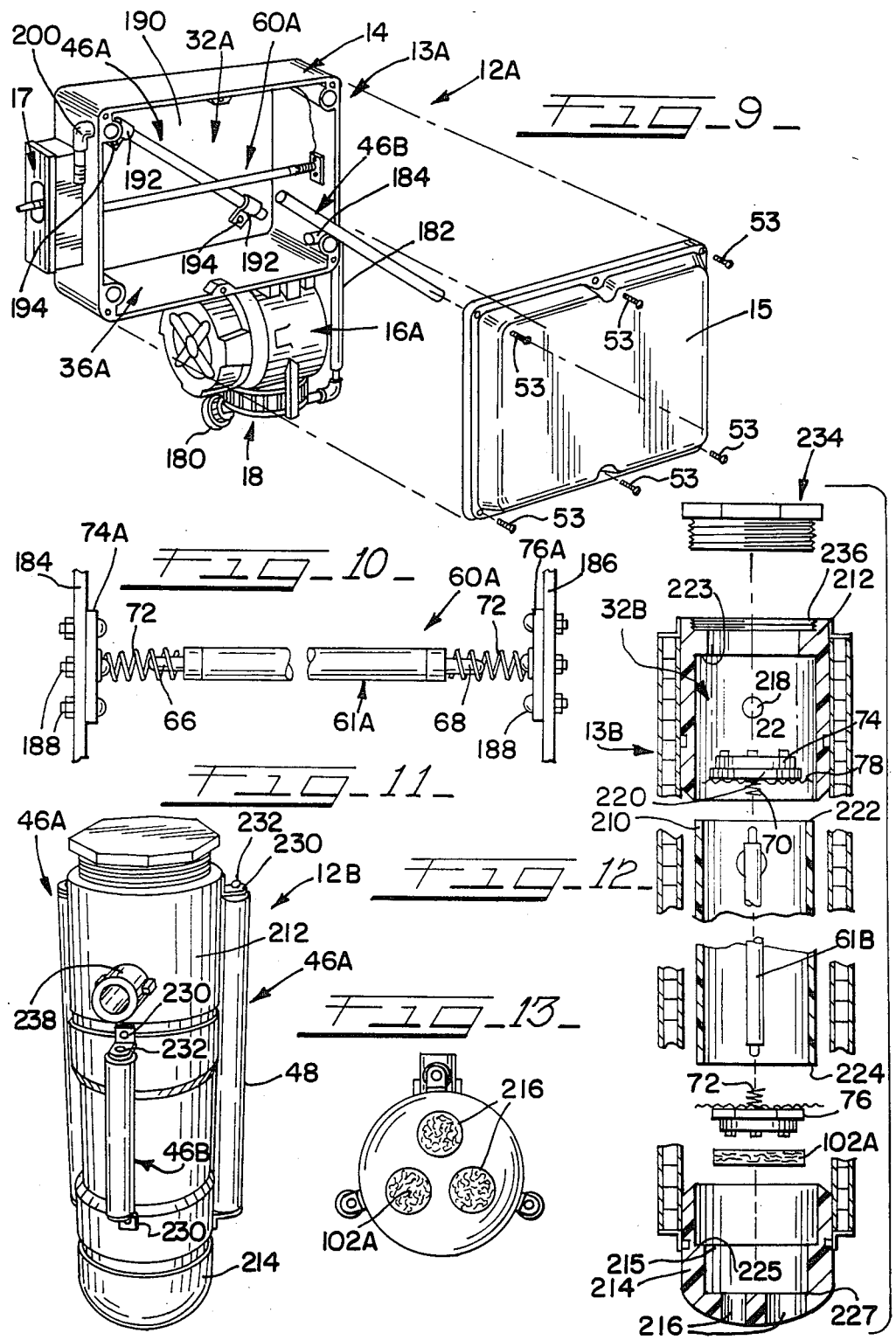

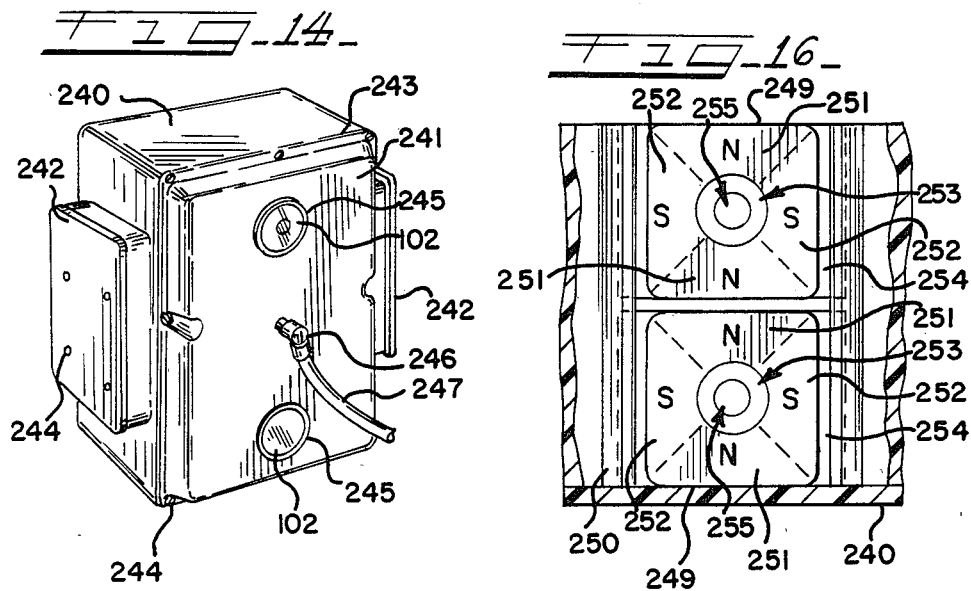
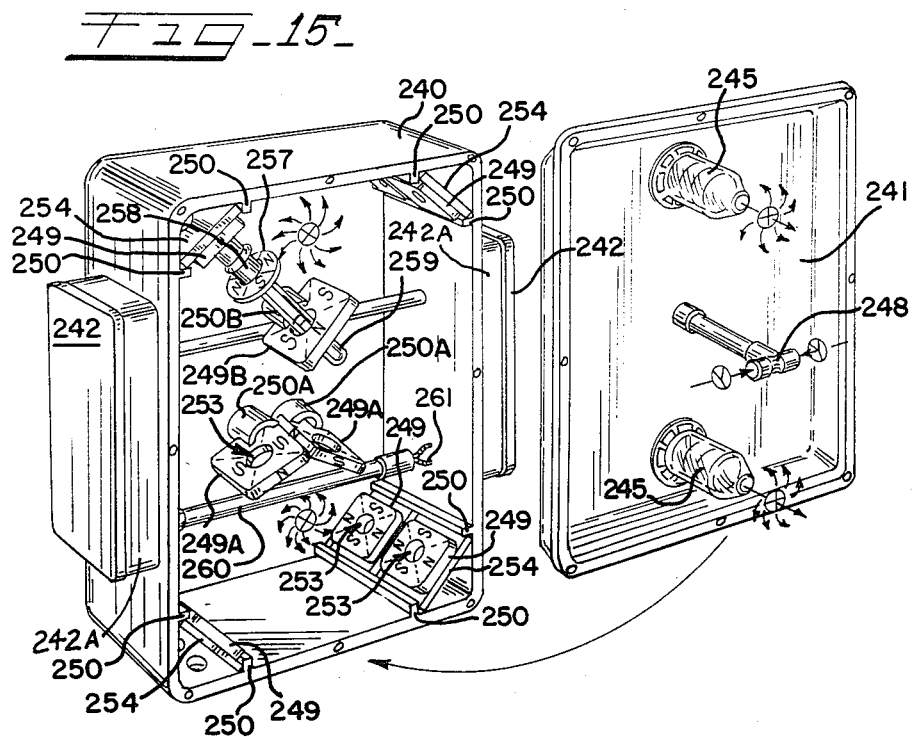

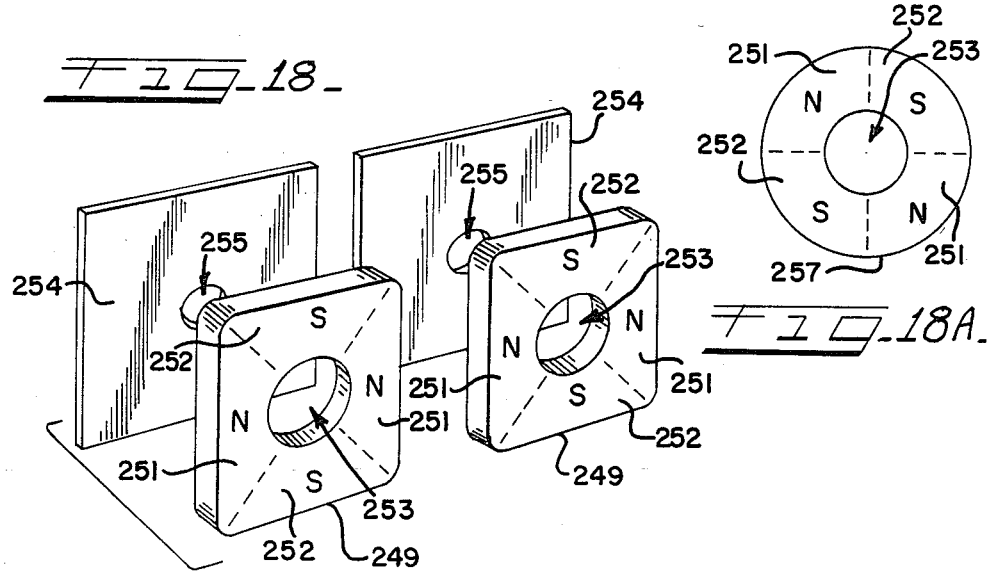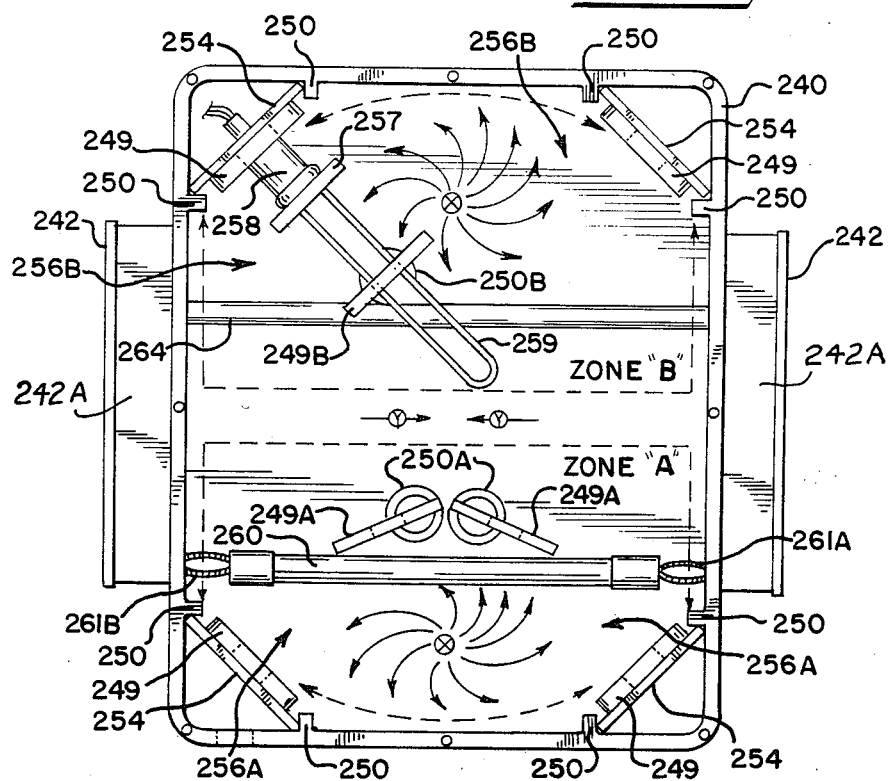

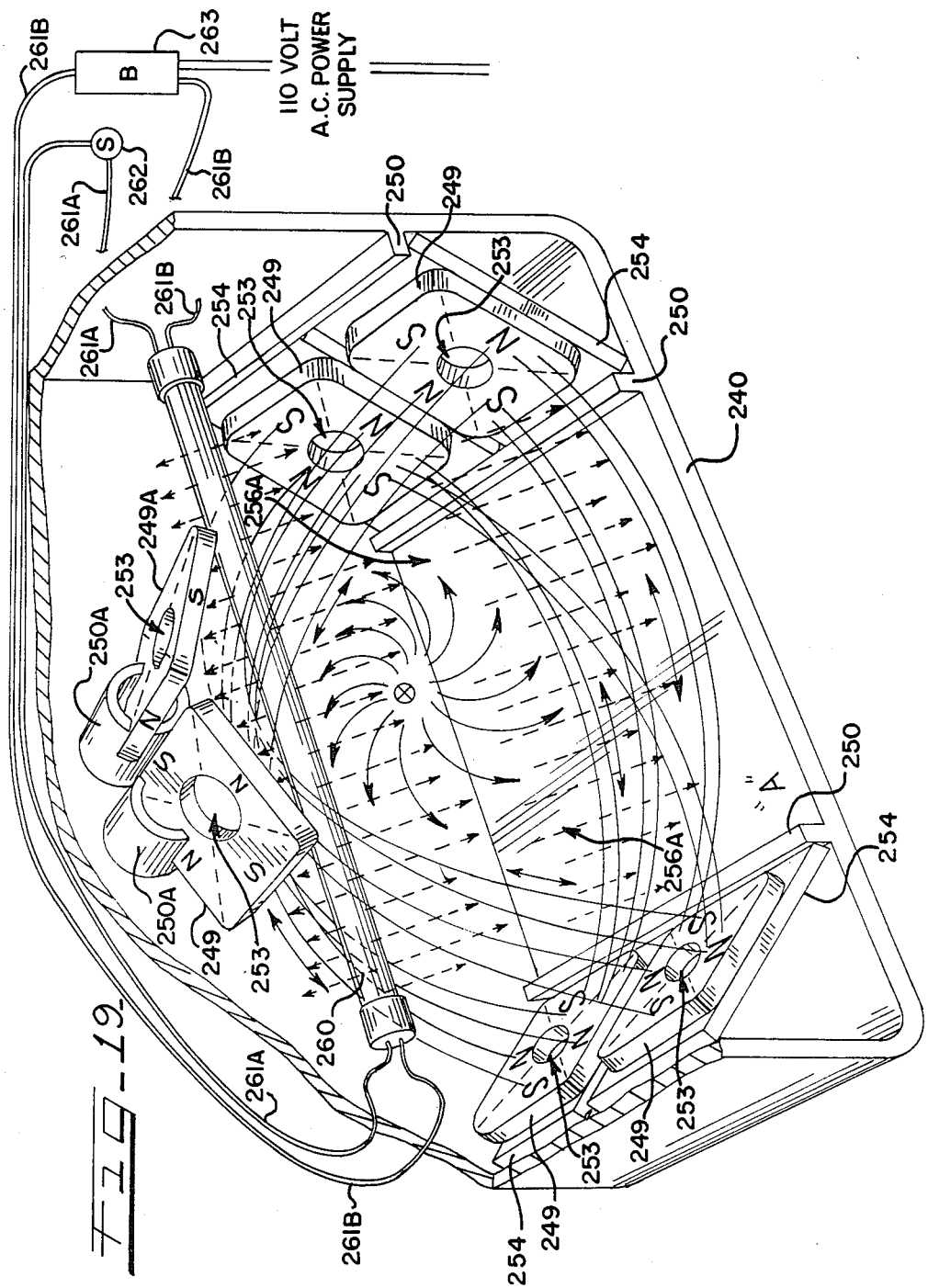

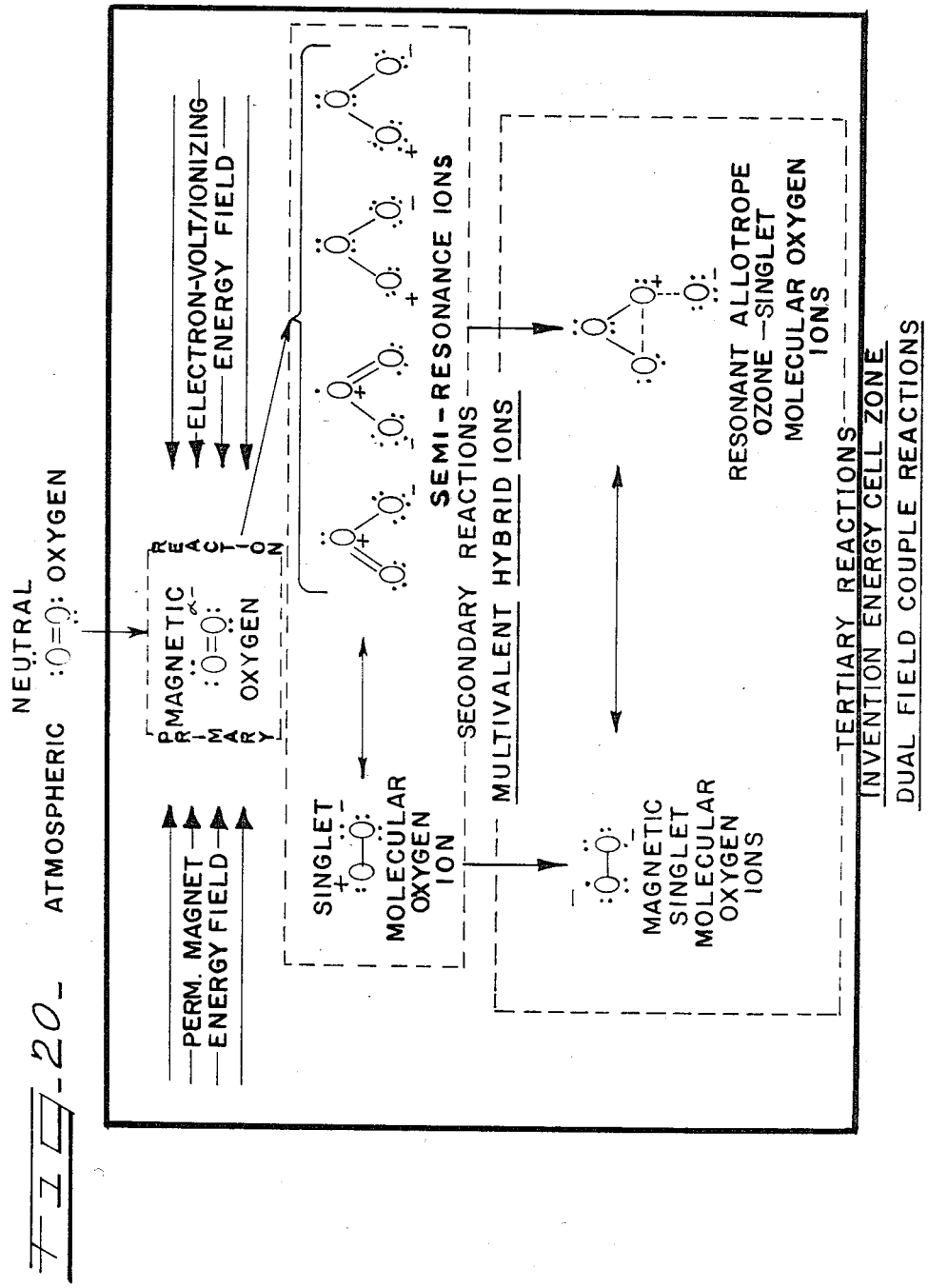

SYSTEM OF IONIZED OXYGEN ALLOTROPE GAS WATER PURIFICATION AND METHOD AND APPARATUS THEREFOR

This application is a continuation-in-part of our application Ser. No. 599,626, filed Apr. 12, 1984, now abandoned, which is a continuation of our abandoned application Ser. No. 403,801, filed Aug. 5, 1982, now abandoned which was a continuation-in-part of our now abandoned application Ser. No. 363,254, filed Apr. 1, 1982 now abandoned (the entire diclosure of which is incorporated herein by this reference).

This invention relates to a system of ionized oxygen allotrope gas water purification and method and apparatus therefor, and more particularly, a system of, and a method and apparatus therefor that generates multiple (multivalent) oxygen ion charged forms for treated water, as for detoxification and general purification purposes, in which the treating agent employed is atmospheric oxygen in the ambient air. More specifically, a basic feature of the invention is to continuously draw an ambient air flow into the system and process same, to concurrently energy transform and ionize the atmospheric oxygen therein to form stable and highly energized multivalent oxygen allotrope ions in oxidant gaseous form that are conveyed to and continuously applied to the water being treated by interspersing the air flow involved therein, for elimination by oxidation and/or flocculation of the contaminants and other undersirable materials contained in same, by the oxygen allotrope ions; with the remaining components of the air returning harmlessly to the atmosphere.

Aside from water purification systems of the filtration and/or integrated ion exchange membrane process type, the vast majority of water purification technology utilized at the present time is concerned with a broad application spectrum of a wide variety of chemcial additive type water treatment processes, a number of which are oxidizing or descaling agents, as distinguished from oxygen or its allotropes, and all of which are not available from the ambient air or natural locale of the water to be treated. Traditional chemical treatment of water has involved a wide variety of industrially formulated chemical substances for disinfection, descaling, detoxification, sterilization, flocculation, or anticoagulation applications or purposes. Purification chemicals commonly may take any one of the three physical states, solids, liquids or gases, and range from complex chemical formulations to highly active elemental substances, such as the halogens. These various chemical compounds or substances for water purification purposes have dramatic chemical structural differences one from another, depending on whether they are categorized, as, for instance, biocides, algacides, fungacides, scale inhibitors, descalers, de-emulsificers, coagulants, coalescents, flocculants, de-toxicants, surfactants, disinfectants, etc. The material of each such category is also susbidivided into several sub-groups with regard to individual chemical strength and reactive oxidizing potentials per soluability limits for chemical water saturation.

In any event, the basic inherent problems associated with water treatment using formulated chemicals has been historically one of "too little or too much" or synergistic inter-reactions that produce new chemical compounds that are corrosive or dangerous. Further, the soluability and reactivity of the chemical additive often changes with water temperature changes; reactivity may be further affected by minor water chemistry natural shifts in acidity-alkalinity values as well as by chemical additive neutralization interaction with other foreign contaminant chemical substances.

Furthermore, it is all too common place that the chemical treatment additive prescribed for a particular problem will have an adverse reaction and be incompatible with other chemical treatment additives or even some of the contaminants in the water system, resulting in no real benefit and often having some deleterious affect on water quality, as well as the possibility of adversely affecting the health of the users of the water.

It is well recognized that the treatment of water with chemicals for purification and related purposes, while widely employed for this purpose in quite a number of different applications, is well known to be an inexact science, with the chemicals themselves often being questioned as the possible source of health problems, such as the causing of cancer, and the like.

On the other hand, water treatment systems that do not involve the addition or use of chemicals as such, but rather employ gaseous ozone obtained from the ambient air, which are of the so-called non-chemical type, have experienced only modest success and acceptance. While the injection of gaseous ozone in neutral molecular form into public drinking water supplies for the purpose of disinfection and purification has been an acceptable practice in Europe since the turn of the Century, and on account of the recognized oxidizing activity of neutral ozone gas, increasing number of applications of it have been made, wider use for all applications has been prevented because of the expense of ozone production, particularly in large volumes. Conventionally large volume ozone gas production is accomplished by employing expensive high voltage electric discharge equipment, such as 10,000 volt corona discharge generators, in which atmospheric oxygen is converted into neutral ozone gas molecules within an intense electrical discharge electromagentic arc zone. Corona generators are known to have excessive power consumption requirements; further, the maintenance requirements of this type of equipment are excessive in that constant repair service is required on the anode-cathode electrodes along with constant servicing of the dehumidifying air dryer and disicating units. Also, large municipal and industrial ozone systems require additional costly cooling tower equipment to relieve generated heat. While small wall hung type corona discharge ozone generating devices have been available since about 1950, their known technical limitations represent real safety concerns due to the relatively high voltage requirements for the generator and the close proximity to the water that is required for the generator. Even in the smaller cornona units, high maintenance requirements for the electrode and air drying modules are a continuing problem.

Nevertheless, as neutral ozone is known to be a strong and rapid oxidizing agent, its consideration for use in purification of municipal water supplies of water has continued. Neutral ozone, however, for rapid purification purposes, requires the delivery of large quantities of the gas for application to the water supply, which, of course, involves large capital expenditures. While the long popular water treating chemical chlorine is now suspected by some knowledgeable authorities as being a contributing chemical source of cancer, neutral ozone gas is simply oxygen in allotrope form and is known to be completely safe in drinking water, and consequently non-chemical gaseous "modified" ozone treatment as generated ionized oxygen allotrope gas in multivalent ion charge forms has commended itself to the Applicants as being worthy of full development and perfection to replace the problem fraught formulated chemical additive approach.

A principal object of the present invention is to provide an ambient air source oxidizing and/or flocculating agent providing a system of water purification and method and apparatus therefor utilizing as the treatment agent atmospheric oxygen that may be obtained from the ambient air, simply treated by inexpensive energy efficient equipment and procedures that induce an ambient air inflow into the system and transform the atmospheric oxygen of such air flow into ionized oxygen (multivalent oxygen ion) allotropes of high energy content, as distinguished from neutral ozone, and which supplies the air flow, including the ionized oxygen allotropes in oxidant multivalent oxygen ion gas form, to the water, and on a constant application basis and in the quantities needed to effect beneficial oxidant multivalent oxygen ion treatment of the water by the ionized oxygen allotropes for all purposes that can be achieved using traditional formulated chemical treatment approaches, including removal of contaminants and other foreign materials.

Another important object of the invention is to provide a simple low cost, highly efficient ionized oxygen allotrope, or oxidant multivalent oxygen ion gas generator and method of generating ionized oxygen allotrope in gaseous form, which uses ambient air as the raw material for the generator, which has no need for formulated chemicals and has drammatically low power requirements while providing the needed capacity on a continual operating basis for large scale water treatment purposes.

Still another important object of the invention is to provide a system of water treatment for purification and related purposes, and method and apparatus therefor, in which the real potential of modified ozone reasonant ion(s) and other oxidizing multivalent oxygen ion allotropes for this purpose is achieved while at the same time providing water treatment alternates to traditional chemical purification systems that avoid the practical problems presented by the presence of chemical additives in water, whether the chemical be one of the halogens, such as chlorine, or otherwise.

Still another important object of the invention is to provide a system of water treatment for purification and method and apparatus therefor that is readily adapted for serving a wide variety of industrial and commercial water purification and filtration enhancement purposes, in addition to purification and sterlization of drinking water, as for instance recycle filtration treatment and recovery of Dairy wastewater, descaling of boiler and cooling tower heat exchange recirculating water systems, bacteria and fungus disinfection of industrial machine tool coolant waters, decontamination and/or agglomeration of solids in industrial water filtration process systems, decontamination of toxic organics from industrial process waters and some oils, disinfection and purification of hot tub spa and swimming pool water, and disinfection and purfication of ground water and rain run off water for human intake purposes.

Yet further objects of the invention are to provide simplified methods and equipment for water treatment purposes whereby the multivalent oxygen ion allotrope gas acts as the sole water treating agent, and is drawn as part of an ambient air flow from the ambient atmosphere and is interspersed into the water by simplified equipment that is inexpensive to manufacture and install, easily operated by even the most inexperienced persons, and that is long lived and effective in use for a wide variety of purposes.

In accordance with the invention, a system of ionized oxygen allotrope gas water purification is provided which involves two basic pieces of equipment, namely a generator for transforming atmospheric oxygen contained in an ambient air inflow into multivalent oxygen ion allotropes, in gaseous form, and a gas diffuser to which such air inflow that includes the oxygen allotropes in gaseous multivalent ionized forms (which air flow is hereinafter sometimes referred to as "multivalent oxidant ion gas", or more simply "oxidant gas") is supplied and diffused into the water or other liquid to be purified for bringing the oxygen multivalent allotrope ions of the oxidant gas stream into dispersed oxidation and/or flocculation contact with undersirable impurities and contaminants. The generator is in the form of a housing defining a fluid flow chamber formed by a non-magnetic material that defines an ambient air flow way or path having an oxygen allotrope forming site through which the ambient air is passed for purposes of transforming the atmospheric oxygen thereof to highly energized or activated oxygen ion allotrope gas in ion atmospheric form, to the exclusion of having any significant effect on atmospheric nitrogen and other components of the ambient air intake of the generator.

The generator oxygen transforming converting site includes both permanent magnetic flux disposing and oxygen photolysis activation radiant energy emitting devices that operate in an intermeshed manner to concurrently transform atmospheric oxygen, which is known to be highly paramagnetic in character, into oxidizing and/or flocculating oxygen ion allotropes that are both stable and multiple ionized in character. The invention contemplates that at the ionized oxygen allotrope forming site, the magnetic flux is in the form of multi-polar permanent magnet induced, multiple magnetic flux fields, of which the magnetic lines of force involved are disposed within and interlace the ambient air flow path defined by the generator. In the originally designed form, the magnetic arrangement is characterized by being in the form of spaced rows of alternately polar rod type permanent magnet type, flux field forming magentic structures disposed to place the flux in flux attracting relation longitudinally and corsswise of the magnet entity forming rows, and an elongate ultraviolet wave length activation energy electron-volt emission source, in the form of a low pressure (low energy requirement) mercury vapor photolysis lamp, disposed in the ambient air flow path and relative to the magnetic flux fields so that photolysis lamp electron-volt emissions envelop the flux of the air flow way or path. The ambient air flow way defined by the generator has an ambient air inlet upstream of the generator oxygen converting site, and an outlet downstream of such site; the generator at the indicated conversion site forms a corridor of the indicated alternate polarity permanent magnet force fields that are inundated by the indicated electronvolt energy emissions through which the air passing through the generator moves. At such oxygen transforming site, the atmospheric oxygen is transformed or energy stepped up into high energy level oxygen allotrope ions by a composite action on the oxygen in which the atmospheric oxygen molecules are magnetically deflected, retained, and concentrated toward and impact against the multiple lines of the permanent magnetic flux fields involved, while at the same time such reacting oxygen molecules are being subjected to photons of electronvolt bombardment by low pressure mercury lamp photolysis ionizing energy emissions involved, whereby the atmospheric oxygen is transformed into stable and highly energized and reactive oxygen allotrope gas in multivalent ionized forms believed to comprise modified resonant ion ozone forms and negatively charged singlet molecular oxygen ions as distinguished from neutral ozone. The remainder of the air passing through the generator site in question is uneffected including atmospheric nitrogen.

The air containing the thus transformed atmospheric oxygen now multivalent ionized oxygen allotropes of the type indicated, is passed as the aforementioned oxidant gas from the generator to the location of the water to be treated, using suitable conduiting where the gaseous flow involved is interspersed into the water, preferably by way of diffusion or other similar techniques. The application to the water may be ordinarily by way of insertion of the oxidant gas in a water conduit or pipe which conveys the water, for instance, from a suitable filter back to the main body of water, whereby after a period of time of continuous operation, the multivalent oxygen ion gas involved reaches a stage of complete interspersion in the water being treated. Water being dipolic in nature, the water presents a naturally occurring magnetic and electrochemical attraction to the multivalent ion oxidant gases dissolved therein, as represented by the indicated oxygen allotropes in ionic form, and this natural attraction results in the highest levels of the multivalent oxygenion allotropes involved being held in saturation in the water regardless of ambient temperature and pressure changes. The natural chemical opposite electrical charge attraction of the oxygen multivalent allotrope ions to the contaminants contained within the water and their oxidation and/or flocculation thereby, is stronger than the electrical charge attraction of such ions to the molecular water involved, with the result that ideal water treatment, such as, purification, descaling, filtration enhancement, etc. is promptly achieved even though the flow and diffusion rates of the air flow into the water are at relatively low volume per unit of time rates.

In this connection the term "multivalent oxygen allotrope ions" as employed herein means ambient air origin oxygen that is transformed by the practice of this invention into oxygen allotrope ions that collectively possess heightened or greater levels of magnetic energy reactivity, as compared to ambient atmospheric oxygen, and possess either (1) a single negative electrical charge, or (2) a double negative electrical charge, and/or (3) a slightly positive and a slightly negative charge, and/or (4) a positive electrical charge; however, it is believed that the charge of the oxygen allotrope ions generated by the practice of the invention provides primarily the single negative charge oxygen allotrope ions and/or the double negative charge oxygen allotrope ions, which are known scientifically as singlet molecular oxygen ions.

Other objects, uses, and advantages will be obvious or beocme apparent from a consideration of the following detailed description and the application drawings in which like reference numerals indicate like parts throughout the several views.

In the drawings:

FIG. 1 is a flow diagram illustrating the basic aspects of the system of the instant application;

FIG. 2 is a fragmental view in perspective diagrammatically illustrating the nature of the special multiple permanent magnetic flux field-photolysis ionizing radiant energy, atmospheric oxygen transforming arrangement, that is at the atmospheric oxygen transforming site of the generator, the showing of FIG. 2 diagrammatically illustrating the entry end of atmospheric oxygen transforming air flow way or corridor of the specific generator embodiment of FIGS. 3-8;

FIG. 3 is a diagrammatic perspective view of one generator embodiment of the invention that is arranged specifically for industrial water treatment applications, with the front cover partially broken away;

FIG. 4 is a side elevational view of the generator of FIG. 3, taken from the right hand side of FIG. 3;

FIG. 5 is a diagrammatic front elevational view of the generator shown in FIGS. 3 and 4, with parts shown in section or in phantom, and with the generator shown connected to a diagrammatically illustrated multivalent oxygen ion gas infusion device of interspersing the oxidant gases produced by the Applicant's system in water to be treated;

FIG. 6 is a diagrammatic exploded sectional view of the generator shown in FIG. 5;

FIG. 7 is a component elevational view taken substantailly along line 7—7 of FIG. 6, illustrating the ambient air intake end of the generator of FIGS. 5 and 6;

FIG. 7A is a fragmental sectional view, on an enlarged scale, illustrating a recycling air flow control device incorporated in the recycling conduiting of FIG. 5;

FIG. 8 is a fragmental view taken substantially along line 8—8 of FIG. 6, illustrating in plan one of the removable electrode assemblies that are employed in the embodiment of FIGS. 2-6 as part of the photolysis device;

FIG. 9 is a diagrammatic perspective view illustrating a smaller capacity generator suitable for commercial non manufacturing applications, such as for treating the water of swimming pools, spas and drinking water installations, with the front panel of the generator and the permanent magnetic rod devices associated with same being shown displaced to expose the interior of the generator;

FIG. 10 is a fragmental sectional view through the generator cabinet of the embodiment of FIG. 9, illustrating the manner in which the photolysis lamp is applied to same;

FIG. 11 is a perspective view of yet a smaller capacity generator that is especially suited for use in connection with home water facilities, such as home swimming pools, hot baths, home owners water purification systems, and the like;

FIG. 12 is a view of the embodiment of FIG. 11 shown in the same manner as FIG. 6, for illustrative purposes;

FIG. 13 is a bottom plan view of the generator of FIGS. 11 and 12;

FIG. 14 is a perspectivew view of a preferred generator arrangement, taken from the front side of same;

FIG. 15 is an enlarged perspective view of the generator of FIG. 14, with the cabinet cover displaced to show the interior of the cabinet, and the cabinet cover shown swung 180 degrees from its position of FIG. 14 to show the back side of same and associated parts;

FIG. 16 is a fragmental plan view on an enlarged scale illustrating the permanent magnet assembly at the lower right hand corner of the cabinet of FIGS. 14 and 15;

FIG. 17 is an elevational view of the preferred generator as shown in FIG. 15, taken from the front side of same and with the cabinet cover omitted, and illustrating several important operational aspects of same;

FIG. 18 is a fragmental exploded perspective view of the dual magnet arrangement that is involved in the magnet assemblies employed in the generator of FIGS. 14–17;

FIG. 18A is a plan view of a modified form of permanent magnet in accordance with the invention;

FIG. 19 is a view similar to that of FIG. 2, illustrating the nature of the multiple permanent magnet flux field photolysis ionizing radient energy, atmospheric oxygen transforming arrangement of the generator of FIGS. 14–18; and FIG. 20 is a schematic diagram illustrating the reactions Applicants believe at this time occur during the operation of their hereindisclosed atmospheric oxygen transforming generators.

However, it is to be distinctly understood that the specific drawing illustrations provided are supplied primarily to comply with the requirements of the Patent Laws, and that the invention is susceptible of modifications and variations that will be obvious to those skilled in the art, and which are intended to be covered by the appended claims.

GENERAL DESCRIPTION

As already indicated, the present invention is directed to a basic approach in water treatment or processing and filtration enhancement for disinfection, descaling, detoxification, purification, filtration enhancement and related purposes, in which the acting agent involved is oxygen allotropes in multivalent ionized forms, and which are obtained by cycling ambient air through the system generator and conduiting the resultant multivalent oxidant gas and the remainder of ambient air involved into interspersed relation within the water to be treated, whereby atmospheric oxygen, to the exclusion of atmospheric nitrogen and other components of the air, is transformed into the multivalent oxygen ion gas that serves as the oxidizing and/or flocculating agent in accordance with the invention.

Referring first to FIG. 1, the flow diagram diagrammatically illustrates the general nature of the Applicants' processing apparatus and system, pursuant to which an atmospheric oxygen transforming generator is provided that is in the nautre of an oxygen allotrope forming and ionizing magnetic reactor and concentration cell, through which ambient air is passed, with the generator defining a gas flow path or corridor having an atmospheric oxygen allotrope forming and ionizing site equipped as diagrammatically illustrated, for instance, in FIGS. 2 and 19, which energy activates only the atmospheric oxygen, to the exclusion of atmospheric nitrogen and the other miscellaneous components of the air, which pass through the generator generally unaffected. The ambient air flow involved leaves the generator as a multivalent oxygen ion gas flow and is passed through suitable conduiting or piping to be dissolved into the water to be treated; the oxidant gas flow involved contains the highly energy charged or energy activated oxygen multivalent allotrope ions in concentrated gaseous form and mixed with the other air components involved, and in the application of the gases to the water, the gases are interspersed and diffused into the water, as by employing gas diffusion or injecting devices of the type hereinafter disclosed. The indicated gas diffusion or injection preferably is into a stream of the water as it is being circulated or recirculated in a continuous flow through a conduit which brings the water to the main body of water to be treated. The atmospheric nitrogen and other components of the ambient air flow involved, which are unaffected by the system generator, are harmlessly interspersed in the water and return to the atmosphere, while the oxygen allotrope ions provided by the system chemically and magnetically seek out the water molecules adjacent same and oxidize and/or flocculate contaminants and other undesirable materials associated with same, to reduce hydrogen bonding surface tension of same, enhance agglomeration and settling out of colloidal solids from same, disinfect and decontaminate same, enhance the filtration of same, and stabilize and buffer pH factors of same.

Diagrammatic FIGS. 3, 4, 5 and 6 generally illustrate the basic components of an apparatus 10 arranged for industrial or manufacturing application use, which includes generator 12 comprising elongate reactor cell 13 mounted in cabinet 14 (see FIGS. 3 and 4) on which cabinet 14 is also mounted, in self contained apparatus 10, suitable electrically operated drive motor unit 16 that drives air compressor 18, which in the embodiment of FIGS. 2–6 draws into the generator cell 13 from the ambient air an ambient air flow that contains the atmospheric oxygen with which the invention system operates, and supplies the transformed atmospheric oxygen and accompanying air though a suitable diagrammatically illustrated conduiting 20 to diagrammatically illustrated gas dispersing device 22 for diffusing the oxidant gas involved into the passing water that leads to the main body of water to be treated, which may, for example, be an industrial machine tool coolant system, or the like.

As indicated in FIGS. 5 and 6, the atmospheric oxygen processing cell 13 of this embodiment of the invention generally comprises a housing or casing 30 defining a gas flow chamber 32, with the housing 30 being formed from a suitable non-metallic material, such as a polyvinyl chloride (PVC). In the embodiment of FIGS. 2–8, the housing or casing 30 is of cylindrical configuration, but in any event the housing 30 is to define the basic reaction cell 13 of the generator and defines, in forming chamber 32, gas flow way 36 having an air inlet indicated at 38, a gas flow or outlet for the treated air, indicated at 40, the latter being suitably connected to compressor 18 by suitable conduit 42.

Compressor 18 may be of any suitable type, that illustrated being a closed chamber diaphragm type compressor, rated for sixty psi output, that is commercially available, as from Gast Mfg. Corp., of Benton Harbor, Mich., with the motor drive unit 16 being suitably affixed to cabinet 14, as by screw mounting or the like, and including a conventional electric motor and associated gear reducer, etc., as needed to mount and continuously drive compressor 18, and in the embodiment of FIGS. 2–8, to provide a gas discharge into conduiting 20 at suitable pressure, depending on the application, as for instance thirty-forty psi. Where the plant or other facility at which apparatus 10 is to be employed has its own built in compressed air supplying conduiting system and source, as many industrial plants do, the cell 13 at the way inlet 38 is suitably connected thereto through a suitable pressure flow rate control valve device of any conventional type, such as a needle valve, to provide the air intake flow pressure rate that results in an oxidant gas discharge flow at outlet 40 in the pressure range indicated; the compressor 18 and its drive unit 16 for such embodiments may be omitted.

The cell 13 along the gas flow way 36 is equipped to define the atmospheric oxygen transforming site 44, which is diagrammatically illustrated in the partial showing of FIG. 2, and which from the standpoint of fundamentals comprises spaced permanent magnet rod devices 46 of a special nature suitably secured with respect to the housing 30. The magnet rod devices 46 each comprise rodlike tubular cylinders or casings 48 each containing a series of permanently magnetized short rod type magnets 50, with the magnets 50 of each casing 48 being longitudinally aligned and in alternating polar relation, and with adjacent magnets 50 being separated by stainless steel slugs or short bars 52 of the same diameter as magnets 50. Magnets 50 in a preferred form are either of the ceramic type at a residual induction strength of 3,000 Gauss, or of the intermediate alloy type (Samarium Cobalt) at a residual induction strength of 9,000 Gauss, and cylinders or casings 46 are formed from either stainless steel or schedule 40 PVC (the latter is preferred). At the opposite ends of the casings 46, a stainless steel slug 54 completes the filling of the casing, with ends 56 of the casings 46 being suitably bonded in place to close casings 46, as suggested in FIG. 6 (welded if stainless steel, cemented with PVC glue if PVC).

The cabinet 14 in which the casing 30 is mounted is a standard electorial cabinet with removable cover 15, both made from PVC or the like, and offered commercially by Hoffman Engineering Corporation, a Division of Frederal Cartridge Corporation, of Anoka, Minn. Magnets 50 are either the ceramic magnet product or the intermediate alloy magnet product commercially available from Indiana General, a division of Electronic Memories and Magnetics Corporation, Valparaiso, Ind. Cover 15 is removably secured in place on cabinet 14 by appropriate screws 53 applied to the respective cabinet walls.

In the specific embodiment of FIGS. 2–6, the housing or casing 30 and rod devices 46 are mounted in place in generator 12, by applying them through cabinet 14, with the rod devices 46 being externally of casing 30 and positionally located in the four equally spaced (circumferentially) positions indicated in FIGS. 2–6, about casing 30. Further, the rod devices 46 of apparatus 10 are oriented such that alternate rod devices 46 are oppositely disposed along the length of the chamber 32, as diagrammatically indicated in FIG. 2. Thus, two of the diametrically opposed rod devices 46 have the north poles of their magnets at the top of the magnets 50, while the other two diametrically opposed rod devices 46 have their south poles at the top of the magnets 50, in the embodiment of FIGS. 2–8.

In the generator 12, the housing or casing 30 and rod devices 46 are applied to cabinet 14 by the cabinet upper and lower walls 55 and 57 being apertured as at 59, to receive them in substantially complemental fit relation thereto, with the housing or casing 30 being suitably anchored to the cabinet 14, as by employing anchoring upper and lower keying screws 69 inserted into casing 30 adjacent the top and bottom of cabinet 14 (see FIG. 4), or by being bonded using suitable PVC glue or the like. Rod devices 46 are lodged against the casing side wall 63 and between the enlarged ends 65 and 67 of same, in the generator 12, as clearly shown in FIGS. 3 and 4, but also may be fixed in place using right angle end brackets or pipe mounting clips and fastening hardware.

Disposed along the way 36, and extending longitudinally of the chamber 32, is the oxygen photolysis device 60 that is in the form of a suitable ionizing electron volt radiant energy emitting lamp 61 designed to emit ultraviolet wave length energy of the nanometer light wave length that insures proper ionization and electronvolt activation of the atmospheric oxygen that is passed through chamber 36. In a preferred embodiment of the invention adapted for industrial applications the lamp 61 is a 40 watt mercury vapor lamp of a commercially available type, such as lamp Model No. G37T6VH 40 watt lamp available from Westinghouse Electric Corporation, which is powered by a suitable conventionally arranged power supply device diagrammatically illustrated at 62 (in block diagram form, see FIG. 6), which includes a suitable starter and a ballast transformer and is suitably mounted in the housing cabinet 14; a suitable ballast is No. 843-SL-TCP, offered by Universal Electric Company of Chicago, Ill., or ballast Model No. SM-140-STP, offered by Advanced Transformer Company of Chicago, Ill., which device 62 may be electrically arranged in accordance with conventional starter and ballast practices, with the ballast being properly matched with the wattage of lamps of the type represented by lamp 61, and provided with suitable plug 64 for connection of electrical energy supply conduiting 19 to the usually available 115 volt AC electrical energy source or its equivalent. Cabinet 14 suitably mounts conventional off-on switch 17 with which motor 16 is suitable connected in parallel with the circuiting indicated in FIG. 6, for suitable manual off-on control of apparatus 10. Where the air supply to generator 12 is from the plant built in compressed air system, the air supply to cell 13 is controlled and set manually by adjusting the aforementioned needle valve.

In the generator 12, the lamp 61 illustrated as offered commercially includes electrodes 66 and 68 at the respective ends of same, which in the form illustrated respectively seat in helical spring type stainless steel electrode contacts 70 and 72, respectively, which are suitably mounted on removable mounting blocks 74 and 76 (see FIGS. 5 and 6), respectively, by centrally located screw and nut assemblies 75 that are formed from stainless steel and also serve as electrical conductors between the respective springs 70 and 72 and the lead wires 77 and 79 for lamp 61 that are suitably connected to ballast device 62 (see FIG. 6). Each mounting block 74, 76 is provided with a foraminous mounting disc 78, secured in place by employing a pair of suitable screw type fasteners 80 (see FIG. 8). Coupling members 88 and 90 form the respective ends 65 and 67 of casing 30 and frictionally receive the respective ends 92 and 94 of the casing side wall 63 to seat disc 78 same against the coupling member respective shoulders 85 and 87, as indicated by FIG. 5. The casing side wall 63 is of cylindrical tube configuration and at its end 92 it is suitably apertured as at 89 for communicating way 36 with conduit 42 in the assembled relation of housing or casing 30. Couplings 88 and 90 are bonded or cemented in place on casing side wall ends 92 and 94, as by employing a suitable adhesive. Disc 78 is in the form of stainless wire grid 95 of large mesh size to accommodate the air flow past mounting block 76 and through way 36 that is contemplated by the present invention, discs 78 conveniently being made of the same size and being apertured as at 97 to accommodate the respective fastening devices 75. Blocks 74 and 76 are preferably removably connected by fasteners 80 to the respective discs 78 for forming removable electrode mounting assemblies for lamp 61, that may be removed from either end of casing 30; removal of one of the blocks, for instance, block 74, permits ready replacement of a lamp 61 by employing a suitable gripping tool applied through aperture 97, for removal and replacement of same through aperture 97.

The coupling members 88 and 90 threadedly mount the respective closure caps 96 and 98 that close off the chamber 36, with the cap 98 being ported or apertured as indicated at 100 (see FIG. 7) for ambient air flow therethrough into chamber 36 on operation of compressor 18 where the generator 12 is to be connected to a plant ported for connection to conduiting leading from the aforementioned needle valve. A suitable dust filtering fiber mesh pad 102 is applied between the cap 98 and mounting block 76, with the mounting blocks 74 and 76 being the same in construction and proportion. Threading of caps 96 and 98 into the respective coupling members closes off the ends of casing 30, and the respective cap flanges 99 space same from the respective shoulders 84 and 86 provide a seal at the casing ends. Lamp 61 is thus mounted for ready replacement of same as needed by removing one of the end caps 96 or 98 for that purpose. Rod devices 46 are lodged between the external shoulders 101 and 103 defined by coupling members 88 and 90. The end couplings 88 and 90, mounting blocks 74 and 76, and end caps 96 and 98, as well as casing side wall 65, are all formed from PVC for ease of assembly and securement, as well as electrical insulating characteristics. Pad 102 is preferably of the fibrous type made up of a mixture of 50% nylon fibers and 50% polyester fibers, all of 100 denier size. The components of generator 12 that are bonded together thus may be so secured by employing PVC glue, but other metallic or non metallic materials may also be employed for forming generator 12, including stainless steel, aluminum, and other plastics, with the bonding required being provided by bonding substances suitable for the materials employed.

In the specific apparatus 10 illustrated in FIG. 5, the conduiting 20 adjacent its inlet 109 includes recycling conduiting 116 that is connected to chamber 36 where indicated at 112 (casing side wall 65 being suitably apertured at 113 for this purpose) for recycling back into the chamber 30 a portion of the treated air flow therefrom, approximately ten percent in a successfully operating embodiment. Conduiting 116 for this purpose includes control orifice device 114 which is diagrammatically illustrated in FIG. 7A and defines the passage 115 therethrough that is in part defined by restricted orifice 115A of orifice disc 118 that may be formed from nylon or the like. Cabinet 14 has mounting studs 117 (See FIG. 4) fixed in its back wall 119 adjacent its four corners for mounting generator 12 on a suitable vertically disposed mounting panel or the like, so as to be disposed as indicated in FIGS. 3 and 4 for operating purposes, using suitable mounting nuts, etc.

Referring now more particularly to FIG. 2, the showing there provided is for the purpose of diagrammatically and schematically indicating, for the embodiment of FIGS. 2-8, the nature of the way or corridor 36 that ambient atmospheric air is passed through on operation of the apparatus 10. The showing of FIG. 2 corresponds to the lower end of the housing or casing 30, with only the magnets and separating and end slugs of rod devices 46 and the magnetic lines of force presented by same, the photolysis lamp 61, and an outline of the cylinder side wall 65, being illustrated (the latter in phantom only), and for the purpose of indicating the peripheral physical confines of the flow way or corridor 36 of generator 12. As already indicated, the magnetic rod devices 46 each comprise the rod type permanent magnets 50 contained within the respective casings 48, with stainless steel rods or slugs 52, which are thus non-magnetic, separating the individual magnets 52, and smaller stainless steel end slugs 54 being disposed at each end of the rod devices 46.

As already indicated, the magnets 50 are mounted within the respective casings 48 in alternate relation so, that, lengthwise of the rod devices 46 unlike poles of adjacent magnets 50 are in magnetic coupling, attraction type, flux defining relation, longitudinally of the respective rod devices 46, as diagrammatically illustrated in FIG. 2 at 120.

As has also been disclosed, it is preferred that alternate adjacent rod devices 46 be oppositely oriented, and for purposes of making clear this feature, in the showing of FIG. 2 one set of alternate rod devices 46 are numbered 46A, and the other set of such alternate rod devices are designated 46B, from which it will be seen that at the intake end of the flow way or corridor 36, the magnet rod devices 46A have the north poles of their magnets 50 at the lower ends of the individual magnets while as to the rod devices 46B, the south poles of the individual magnets 50 are at their lower ends. Thus, the magnets 50 of magnet rod devices 46A have their north poles at their lower ends, while the magnets 50 of magnet rod devices 46B have their south poles at their lower ends; the devices 46A and 46B are accordingly in inverted, oppositely oriented, relation. The rod devices 46, which for any generator 12 may be all devices 46A, or all devices 46B, are arranged in the alternate position form of generator 12. With this in mind, it is a feature of the invention that with the rod devices 46 employed having a spacing consistent with the objectives of the invention, magnetic flux of attraction pattern type will form crosswise extending magnetic flux patterns 122 between the adjacent rod devices 46, as diagrammatically illustrated in FIG. 2 for generator 12 that involves devices 46A and 46B, between the north and south poles of parallel, coextensive magnets 50, of the adjacent devices 46A and 46B. Where only devices 46A, or only devices 46B are employed in a given cell 13, the same flux patterns 122 will be present, but shift a bit askew from substantial normal relation relative to adjacent devices 46 (since like poles will be at like ends of the respective magnets 50). Where devices 46A or devices 46B are oppositely or diagonally opposed across way 36, it is believed flux patterns 122 will extend between them also, at least to a degree.

In this connection, it is pointed out that in the showing of FIG. 2 the flux patterns are only each partially illustrated to avoid an undue confusion of lines. Flux fields 120 are oriented 360 degrees about their respective devices 46, 46A and 46B, and each flux field 120 extends longitudinally of one aligned adjacent pairs of magnets 50, with the multiple force lines thereof extending between the unlike poles of such pair, as indicated in FIG. 2. Flux fields 122 each comprise lines of force extending between unlike poles of adjacent coextensively parallel magnets 50 of adjacent devices 46, 46A and 46B, as indicated in FIG. 2, and are of the approximately elongated, flat elliptical attraction form indicated.

The strength and orientation of the cross magnetic lines of force of cross magnetic fields 122, in attraction pattern, will depend on how many rod devices 46 are employed in a particular unit, the strength of the magnetic fields of the respective magnets involved, and the spacing of the respective rod devices 46 from each other. For purposes of the present invention, it is critical that there be at least one pair of devices 46A, or one pair of devices 46B, or one rod device 46A and one rod 46BA (that is, a second rod device 46 having the opposite polar orientation indicated by the rod devices 46B relative to rod devices 46A) at diametrically opposed positions at the margin of the flow way or corridor 36, although rod devices 46 making up devices 46A and 46BA may be located interiorily or exteriorily of the chamber 32, assuming the chamber 32 is defined by a suitable non-magnetic material such as the aforementioned PVC. For best results, the rods 46A and 46B should have a spacing that lies in the range of from about two inches to about eight inches, depending on the physical configuration of the flow way or corridor 36, which can also be of parallelepiped configuration, in addition to the generally round or cylindrical configuration illustrated in the embodiment of FIGS. 2–8. It is preferred, however, that the photolysis lamp 61 be disposed at the mid portion of the flow path, it being a further feature of the invention that the ionizing electron volts energy emanating therefrom, is emitted 360 degrees thereabout, and is in blanketing or enveloping relation to the magnetic flux patterns 120 and 122.

In this connection, the ballast and the wattage of the photolysis lamp 61 employed should be carefully matched in accordance with standard techniques to produce an electronic mercury vapor excitation which yields predominantly nanometer spectral wave length emissions, in the range of from about 170 to about 257, with the preferred ranges being between 170–190 and 253.7–257, which provide the short wave length ultraviolet electron-volt light energy that maximizes ionization of atmospheric oxygen, and longer wave length infrared emissions that are believed to impart a reinforcing thermal magnetizing effect on the resulting ions.

When ambient air flow is induced into and through flow way or corridor 36, the bulk of the air entering the flow way or corridor 36 at its intake end 121 is atmospheric oxygen and nitrogen, atmospheric air containing approximately 80 percent nitrogen and 20 percent oxygen by volume. While ordinary free nitrogen is recognized as being one of the most non-magnetic and stable of all atmospheric elements, oxygen is one of the most paramagnetically active and chemically reactive of atmospheric elements, although its activity is greatly reduced in atmospheric form because it is mixed with about four times its volume of nitrogen. However, oxygen in free atmospheric form ($O_2$) has appreciable paramagnetic characteristics which the Applicants have found to be a major factor in providing the unique results achieved by the present invention. In this connection, the Applicants have found that atmospheric oxygen gas molecules are significantly more paramagnetic in character than the relatively inert atmospheric nitrogen molecules, so much to the extent that atmospheric nitrogen molecules are essentially unaffected by the presence of intense magnetic fields.

It is a basic feature of the present invention that the Applicants employ the paramagnetic characteristics of atmospheric oxygen molecules, and the capability of atmospheric oxygen of readily being ionized into modified ozone ion resonance structures and/or other multivalent oxygen ion allotropes, to serve as the basis for providing the oxidizing and flocculating agent that is to be interspersed in the water to be purified. However, the Applicants have found that their special magnetic flux field patterning for the generator flow way or corridor, and the inundation of same by ionizing electron-volt ultraviolet wave length emissions, produces stable but highly energized multivalent oxygen ion allotropes of electrically charged resonant ozone ions and singlet molecular oxygen ions (as distinguished from neutral ozone), which have been proved to be far more active and effective in achieving non-chemical type water purification, disinfection, detoxification, descaling, and the like, than neutral ozone or neutral atmospheric oxygen, and without having to use any supplemental chemicals of any kind. This discovery thus permits the Applicants' water treatment to be provided by the active substance being taken from the ambient atmosphere and applied to the water in question for highly effective purification and filtration enhancement etc. results without adversely affecting the water in any way or the conduiting or containers which guide or contain same.

Referring again to FIG. 2, it is to be understood that on actuation of the apparatus 10, as by moving switch 17 to its circuit closing position (assuming plug 64 is connected to a suitable source of electrical power), atmospheric air enters flow way or corridor 36 under the action of compressor 18. In the embodiment illustrated in FIGS. 2–8, this air flow is in an annular pattern about the photolysis lamp 61 and is through the portions of the flux patterns 120 and 122 that are within the flow way or corridor 36, the latter being, as indicated, enveloped and bombarded by the radially directed emissions from the photolysis lamp 61.

The relatively inert atmospheric nitrogen content of this air flow follows the rectilinear or straight dashed line 130 of FIG. 2, which indicates that atmospheric nitrogen passes directly through the generator 12, under the action of the air flow inducement provided by compressor 18, without being in any way affected or changed by generator 12. The components of the ambient air other than atmospheric oxygen follow the same pattern in the air flow through way 36.

However, the molecules of atmospheric oxygen, on entering the flow way or corridor 36, are immediately deflected by attraction to the multiple magnetic lines of flux involved in flux patterns 120 and 122, and such molecules being highly numerous within the air flow, are deflected in multiple random directions within the flow way, while at the same time they are bombarded by the photolytic electron-volt radiations emanating from the photolysis lamp 61. As indicated, the atmospheric oxygen on leaving flow way or corridor 36 at its outlet end 123 is transformed and ionized to stable but highly energized and reactive multivalent oxygen ion allotropic structures and appear to be electrically charged ionized ozone and singlet molecular oxygen.

It is believed that as the atmospheric oxygen passes through the flow way or corridor 36 under the inducement of the air flow involved, the atmospheric oxygen molecules are deflected, retained, and bounced around by and between the flux lines of force within the way or corridor 36, with the atmospheric molecules apparently having multiple impacts with each other in the presence of the permanent magnetic flux and the ultraviolet electron-volt ionizing radiations. It appears that the atmospheric oxygen molecules themselves by reason of such impacts within the magnetic fields involved achieve increases in their vibrational and rotational energy levels and absorb magnetic flux energy to reach ligher levels of paramagnetic energy state. The ultraviolet electron-volt energy acts on these energized atmospheric oxygen molecules to provide the electron activation energy requirements that disassociate or dissolve the naturally occurring atmospheric oxygen double electron bonds (atmospheric oxygen having a valence of 2), that releases atomic oxygen, with the free atomic oxygen making available intense electrical and magnetic energies within the flow way or corridor 36. The atomic oxygen appears to reform under the inducement of the ultraviolet emission energy involved to apparently form hybrid resonant ozone ions and multivalent singlet molecular oxygen ions that are stable at much higher energy levels and have been found to possess oxidizing and/or flocculating activation characteristics, when interspersed in water, that are much greater than can be achieved with atmospheric oxygen or neutral ozone. It appears that the resulting newly formed multivalent oxygen ion allotropes have a charge center which appears to have an appreciable negative charge within the higher electron bond structure of the resulting ions, as well as the ion generated higher paramagnetic attraction capabilities, and are thus successively step up energy activated by the practice of this invention.

A factor that apparently aids in the high energy charging of the oxygen allotrope ions involved is that the magnetic flux of way or corridor 36 appears to have a magnetic attraction effect on such ions, tending to concentrate within way 36 the oxidant gas involved, to the exclusion of the atmospheric nitrogen and other air components (other than oxygen) of the air flow through way 36, thus prolonging the transformation treatment and "concentrating" time of the atmospheric oxygen molecules involved within the generator, with added water purification benefits from the standpoint of increasing reaction and oxidizing or flocculating potential of the multivalent oxygen ion gas stream when diffused into contaminated water flow.

The recycling oxidant gas flow provided by conduiting 110 back to flow way 36 has been found to have a catalytic effect on the atmospheric oxygen transformation within way 36 which surprisingly increases the aforementioned ionic oxygen allotrope content of the air discharge at way outlet 123 in the range of 7–10 percent.

The air flow containing the transformed atmospheric oxygen, the unaffected nitrogen, and the remainder of the air content that has entered at inlet 38, is discharged into conduiting 20 for conveyance to gas diffusion device 22, and for the generator 12, the gas discharge will be in the range of 30–40 psi, though this pressure will depend on the capacity of the compressor 18 (or the pressure of the compressed air supplied to cell 13 from a plant conventional compressed air source), the flow rate factors of the gas through flow way 36, and the like that can be suitably adjusted to suit conditions, and needs of specific application.

A special aspect of the invention is that the presence in the Applicants' oxidant gas generator 12 of the magnetic flux fields in the flow way 36 is that the flow way or corridor 36 is made self cleaning for the length of the photolysis lamp 61, as the permanent magnetic flux keeps ambient water, oil, and dust from adhering to the photolysis lamp 61, thereby avoiding gradual build up of such deposits on the lamp and gradual blocking of the ultraviolet rays emitting therefrom. Matter of this type bears a slight charge and otherwise tends to adhere to the photolysis lamp, lamps of this type producing their own magnetic field. Thus, even though the Applicants' generator 12 is intended to operate continuously, its photolysis emission function continues with no decrease and unabated during the entire period of operation due to the self cleaning action the Applicants' magnetic fields have on the photolysis lamp. The permanent magnet flux fields with which the photolysis lamp is associated in accordance with the invention are far stronger than the electro magnetic field generated by the lamp itself. Atmospheric moisture, dust, and oil vapor impurities are held in vapor suspension by the stronger permanent magnetic field and pass through the generator with no insulating effect on the photolysis lamp. It is thus a feature of the invention that the magnet devices 46A and 46B have a length that makes the magnet devices at least substantially coextensive with the photolysis lamp they are associated with in a flow way 36.

For purposes of disclosure, diffusion device 22 is shown incorporated in conduit 150 through which a water flow that originates from the body of water to be treated is circulated, and for disclosure purposes conduit 150 may be assumed to represent a water return line of a machine tool water coolant system conveying the coolant water from the point of use to the point of storage for reuse. Diffuser 22 comprises a pair of couplings 152 and 154 receiving in leak free relation thereto the ends 156 and 158 of the conduiting 150 at diffuser 122, as well as the ends 160 and 162 of diffuser tube 164 that is formed from a suitable porous material, such as the sandstone tube product made and sold by Norton Company (Industrial Ceramics Div.), Worcester, Mass. Sleeve 166 is mounted between the couplings 152 and 154 in leak free relation thereto and in spaced relation about tube 164 360 degrees thereabout to define air pooling chamber 168 into which the air including the transformed oxygen passes from conduiting 20. The air including the transformed oxygen permeates through the tube 164 and is diffused into the water flowing through conduiting 150 in small bubble size form, the pressure of the air within the conduiting 20 being under higher pressure than the liquid within the conduit 150. A pressure difference on the order of five pounds per square inch is normally adequate to serve this diffusing function.

Alternately, the gas flow from conduiting 20 may be injected into water flow conduiting 150 or its equivalent utilizing the injectors disclosed in Dennis E. J. Johnson U.S.A. Application Ser. No. 645,400, filed Aug. 29, 1984 (the disclosure of which pertaining to FIGS. 1–3 is incorporated herein by this reference).

Another important aspect of this invention has to do with the special compatibility provided by the multivalent oxygen ion gas supplied to the water to be treated by the apparatus 10, and the dipole electrical nature of water. It is well known that as a result of the distribution of the electrons and hydrogen atoms in water, one end of the water molecule may be considered positively charged and the other end negatively charged; such molecules are said to be electrically dipole in nature and they have a dipole moment which is dependent upon the magnitude of the charges and the effective distance between them, water molecules being known to have a high dipole movement.

The present invention thus contemplates that by the application of the transformed oxidant gases into water there is a naturally occuring magnetic and electro chemical attraction of the multivalent oxygen gas ions to and among passing water molecules, to the extent that as the apparatus 10 operates to provide the multivalent oxidant gas diffusion into the water to be treated that has been indicated, including the transformed oxygen content thereof, the highest level of the multivalent oxygen ion allotropes involved can be held in solution in the water during processing of same regardless of ambient temperature and pressure changes. With the multivalent oxidant gases inserted in the water to be treated thus being widely dispersed by the natural electrical charge affinity of the oxygen allotrope ions to water molecules, the oxidant ions are brought into corresponding oxidizing or flocculating relation to the impurities involved by the stronger electrical-magnetic charge attraction of the oxidant multivalent ions to the contaminants than to the water molecules. Furthermore, the multivalent oxygen ions involved have also been found to have a neutralizing effect on the water molecule hydrogen bonds that comprise surface tensions. The surface tension (and the associated electrostatic attraction hydrogen bonding of water to contaminants) involved may be reduced in the range of from about 20 to about 40 percent, but in any event surface tension reduction is significant and facilitates settling out of contaminant solids that are entrained in the bonded together water molecules.

Several examples of tests illustrate the effective nature of the practice of the invention.

In one test, an embodiment of the invention arranged in accordance with the embodiment of FIGS. 2–8 was employed to diffuse air flow from a conduit 20 at the rate of 0.1 cubic foot per minute into the return condensate make up water that was intermittently fed to a 100 horsepower low pressure steam boiler, the study being carried out in a Chicago, Ill. industrial facility. The object of the study was to evaluate the ability of the invention multivalent oxidant gases as diffused in the condensate make up water to oxidize and/or flocculate remove or descale plated calcium carbonate and magnesium carbonate scale encrustation from the internal boiler fire tube surfaces and the internal surfaces of the water piping distribution system involved. It was also desired to prevent rescaling, and improve the entire system heat transfer by removal of insulating solids from the water. After thirty days practice of the invention, without any chemical descaling agents being employed, it was found that the water system contained large quantities of loosened scale deposits that were filtered out of the system. The water being treated had an increase in pH acidity at the same time indicating that scale solids have been coming into and out of solution in the water within the return condensate flow; it has been found that the oxidant gas removal of plated calcium carbonate scale deposits in practicing the invention as represented by this test releases carbon dioxide gas from the carbonate structure as the carbonates are oxidized, with the carbon dioxide immediately forming carbonic acid in the boiler water and freely assisting in the efficiency of complete boiler system descaling with the resultant vast fast improvement in heat transfer characteristics.

Another test involved the application of an embodiment of the invention in accordance with the showing of FIGS. 2–8 to treatment of contaminant water based machine tool coolants. Water soluable oil coolants, semi-synthetic coolants, and full synthetic coolants were evaluated for, among other things, the degree of fungus and bacterial decontamination achieved by the practice of the invention; results indicated that an 85 percent reduction occurred in total bacteria count within four to six hours of the commencement of the operation of the invention, which involved a continuous application of 0.1 cubic foot per minute oxidant gas application to the liquid being treated on a recirculation batch treatment basis. Fungus populations in the coolants being treated were found to be completely destroyed within the first two hours of the treatment.

Yet another test involved the application of an embodiment of the invention equivalent to the arrangement of FIGS. 2–8 in which 0.2 cubic foot per minute of the oxidant gas flow from a conduiting 20 was continuously diffused into a twenty-five gallon sample of drinking water aquafer ground water contaminated with 1500 parts per billion of trichloroethene (TCE). Within two hours after treatment commenced, TCE contamination levels had been reduced 99 percent or greater with improvement in overall water clarity.

In the embodiment of FIGS. 2–8, the cylinder or casing 30, the coupling members 88 and 90, the caps 96 and 98, and the mounting blocks 74 and 76 are all formed from polyvinyl chloride of a suitable grade. Motor 16 and compressor 18 are conventional commercial apparatus while the conduiting 20, 42, and 110 may be any type of conduiting, althogh plastic conduiting is preferred because of its simplicity of application. The diffuser coupling members 152 and 154 and sleeve 162 may be formed from polyvinyl chloride and suitable bonded together in leak free relation, as well as to conduiting 150, as by employing PVC glue.

The air flow through flow way or corridor 36 may be mechanically generated, as in the embodiment of FIGS. 2–8, but for installations requiring only a low oxidant gas flow rate at the diffuser, say in the range of from about 0.05 to about 0.1 cubic foot per minute, convection flow through the generator, as induced by the operation of the photolysis lamp 61, will provide adequate flow rate application of the oxidant gases to the liquid to be purified.

The lamps 61 as applied to generator 12 are preferably of 40 watt capacity, and for industrial applications the apparatus 10 may have several additional cells 13 mounted in the cabinet 14 in the same manner but in spaced relation for increased oxidant gas capacity, as desired, and of course, each cell is equipped as indicated in FIGS. 2–8. Industrial generators of two and four cells comparable to generator 12 with their ways 36 connected both in series and parallel, insofar as their ways 36 and their connection to conduiting comparable to conduiting 20 are concerned, depending on the flow rate supply needs for particular applications, and with their cells 13 applied to cabinet 14 horizontally, have been in active successful experimental use by Applicant. Where the oxidant gas capacity has lower requirements, of course the lamp 61 may be proportionally of lesser wattage, and the magnet devices 46 in or about a particular way 36 may be reduced in number to two or three;

13 watt lamps and appropriately matched ballasts in association with other component parts of the type illustrated have been successfully operated by Applicant, employing devices 46 in numbers of two or three, in spaced relation about the way 36, where oxidant gas supply requirements are suitable for such low flow rate applications as swimming pools, home drinking water purification, and the like.

ALTERNATE EMBODIMENTS OF THE INVENTION

FIGS. 9 and 10 diagrammatically illustrate an alternate lower capacity generator embodiment 12A of the invention in which cell 13A comprises a cabinet 14 and its cover 15, in which the cabinet 14 has suitably affixed to its underside suitable compressor 18 driven by suitable motor 16A, to draw ambient air into inlet 180 and discharge it into conduiting 182 that discharges it at outlet 184 into the chamber 32A that is defined by cabinet 14. As indicated in FIG. 9, the chamber 32A is parallelepiped in configuration and has at its mid portion an electron-volt emitting lamp 61A, forming the photolysis device 60A of generator 12A, mounted to extend thereacross, and between a pair of mounting blocks 74A and 76A that are fixed to the respective sides 184 and 186 of the cabinet 14, as by employing appropriate screw and nut type fasteners 188. The mounting blocks 74A and 76A each have secured thereto stainless steel helical compression springs 72 of the same type disclosed in connection with the apparatus 10 for mounting of the lamp 61A, compression spring style as indicated in FIG. 10, with the springs 72 being incorporated in circuiting of the type indicated in FIG. 5 for operation of the lamp 61A. Shifting lamp 61A to either side of FIG. 9 will effect ready removal and corresponding replacement of lamp 61A in its mounting springs 72. For low capacity requirements lamp 61 and associated parts may be replaced by a replaceable commercially available 13 watt screwable electron-volt emitting lamp applied to a suitable lamp base socket secured to one of the cabinet sides 184 or 186.

Applied to either side of the chamber 32A is a magnetic rod device 46A on the back side 190 of the cabinet, and a magnet rod device 46B that is fixed to the cover 15. The rod devices 46A and 46B are the same as shown in connection with the apparatus 10, with the rod device 46B thus in fact being the same as rod device 46A, but having its position reversed in the manner indicated in FIG. 2 for the rod devices 46A and 46B there illustrated. The rod devices 46A and 46B of the generator 12A are fixed in place employing suitable clamps 192 secured in place by suitable screw fasteners 194 (omitted in the showing of rod device 46B). Cover 15 is secured to cabinet 14 employing suitable screws 53. Cabinet 14 has fitting 200 affixed thereto that serves as the multivalent oxidant ion gas bearing gases flow outlet from chamber 32A, which is connected to the water to be treated in a manner comparable to the apparatus 10.

The compressor motor 16A and the photolysis lamp 61A are connected, for operation of generator 12A into suitable circuiting of the type indicated in FIG. 6 (for activation of the generator 12A). The chamber 32A defines a flow way or corridor 36A that functions in a manner similar to that of the apparatus 10, with the magnetic rod devices 46A and 46B providing the permanent magnet flux longitudinally and crosswise of the way that is required and the photolysis lamp 61A providing the ionizing electronvolt ultraviolet wave length emissions that, in combination, transform provide the atmospheric oxygen of the air flow through way 36A to the multivalent oxygen allotrope ions that have been referred to, with the generator 12A providing a flow rate at the fitting 200 as needed for the water treatment application to which the generator 12 is to be applied. The capacity can be varied in accordance with requirements by employing a compressor 18 of suitable capacity and a photolysis lamp 61A of suitable capacity, which for low capacity requirements may be as low as 13 watts, with a flow rate from fitting 200 at a level of 0.5 cubic feet per minute.

The embodiment of FIGS. 11–13 illustrates a generator 12B that is similar to generator 12 but is intended for low capacity applications in which requirements are such that the air flow through the generator may be convection induced by the heat of operation of the photolysis lamp 61B. Generator 12B is of simplified design in which cell 13B comprises cylindrical member or shell 210 that is comparable with casing 30 and receives over its ends the respective coupling members 212 and 214, between which are mounted a pair of magnetic rod devices 46A in diametrically opposed relation on generator 12B, and a magnetic rod device 46B of a shorter length, applied between the two. The devices 46A and 46B have the orientation suggested in FIG. 2 insofar as their permanent magnets are concerned. The coupling member 214 is formed with a plurality of atmospheric air inlet ports 216, while the coupling member 212 and sleeve 210 are formed with apertures 218 and 220, respectively, that are aligned in the assembled relation of the generator 12B in which the sleeve ends 222 and 224 seat discs 78 of the respective mounting blocks 74 and 76 against shoulders 223 and 225 of the respective couplings 212 and 214 in the assembled relation of generator 12B, similar to generator 12; in the case of mounting block 76, the disc 78 of same is interposed between shell end 224 and shoulder 225 to mount block 76 in place, with filter pad 102B, that is of the same type as pad 102 of FIG. 6, being interposed between the disc 78 of mounting block 76 and ports 216 of coupler member 214, as in well 227. In this embodiment, magnetic devices 46A and 46B are affixed to the generator 12B in the positions indicated in FIG. 11, employing angle shaped fittings 230 that are suitably anchored to the respective coupling members 212 and 214 and receiving studs 232 affixed at the ends of the magnetic device casings 48 for this purpose. Cap 234 is threadedly received in internally threaded socket 236 of coupling member 212 to close in the chamber 32B defined by generator 12B, and is removable for removable seating of the upper terminal 66 of lamp 61B in its spring seat contact 72. The apertures 218 and 220 in the assembled relation of the generator 12B are lined up with outlet fitting 238 which in use of the generator 12B is connected to a conduiting 20 and diffuser 22 or their equivalents for diffusing application of the oxidant gas containing air flow from generator 12 into the water to be treated. The shell 210, coupling members 212 and 214 and cap 234 are preferably formed from a suitable grade of polyvinyl chloride, with coupling members 212 and 214 being suitably bonded in place, in the positions indicated on sleeve 210, as by employing a suitable bonding cement. The shell 210 defines between coupling members 212 and 214 a cylindrical body portion of reduced external diameter over which devices 46A and 46B extend, and about which a suitable strap fastener device may be applied to secure generator 12B to an upright support post or the like, in the upright position of FIG. 11.

The operation of the generator 12B on energization of the lamp 61B is essentially the same as for the other embodiments of the invention except that the heat provided by the photolysis lamp 61B is relied upon to induce the air flow from the air flow way inlet at apertures 216, through filter pad 102A, through the combined permanent magnet flux fields and photolysis lamp emissions, and thence through the generator outlet defined by apertures 218, 220 and fitting 238, into conduiting that leads to the water to be treated, in a manner comparable to the showing of FIG. 5. The generator 12B is devised for relative low oxidant gas flow rate needs, such as for home swimming pools and drinking water treatment, or for filtration enhancement solids removal systems, which may be in the range of 0.050–0.1 cubic foot per minute.

While generators 12A and 12B may have their air supply requirements effected by the aforementioned connection to in plant available compressed air systems, these generator embodiments are devised for low capacity use where such compressed air systems are not available.

PREFERRED (BEST MODE) INVENTION EMBODIMENT

The embodiments of the invention illustrated by the showings of FIGS. 1–13 evolved toward what is now believed to be the best mode arrangement, as a result of numerous applications of the invention, and empirical response water quality purification results and systems engineering positive feedback that has been evaluated and gathered from nationwide YMCA pool and other public pool commercial applications along with numerous industrial applications. These efforts have in turn resulted in the arrangement of FIGS. 14–19, which is believed, as indicated, to represent the best mode embodiment of practicing the invention at the present time.

Appreciable improvements in the invention embodiment structure, embodiment orientation, and energy field inter-reaction intensity are quite apparent upon a review of the embodiments of FIGS. 1–13 when compared to the best mode embodiment of FIGS. 14–19. The embodiments of FIGS. 1–13 involve a singular cocurrent energy field zone of combining magnetic energy and ionizing electron-volt energy in which ambient atmospheric air passes through the oxygen converting site as a single-pass air flow function involving incoming atmospheric air entering through openings in one end or corner of the apparatus generator, and then passing throughout a linear or rectilinear cocurrent field zone in a substantially unidirectional air flow toward the opposite end or corner exit opening. In the embodiment of FIGS. 14–19, an arrangement is provided that utilizes multiple magnetic and ionizing electron-volt cocurrent energy field zones (resembling energy cells and hereinafter called energy cell zones) into each of which the entering atmospheric air is drawn at a centermost high energy intensity position in a 360° rotational/hurricane-like air flow directional pattern. Further, while the magnetic energy and electron-volt energy levels of the respective cocurrent energy cell zone will vary in intensity and magnitude due to their specific arrangements the resultant oxygen gas air flow through each zone merges with that of the other cabinet zone at a common centrelly located cabinet outflow port for conveyance to point of insertion or dispersion in the water being treated, as per the arrangement of FIG. 5. The indicated energy cell zones each exert a multitude of stressful and interacting magnetic and ionizing energy forces upon the atmospheric oxygen air flow passing through same, which causes irregular and deflecting or "repeat contact", turbulent, rotational movement of the paramagnetic oxygen gas flow within the internal flux density magnetic lines of force fields of the respective cells that represents an oxygen gas concentrator system that has three dimensional multi-pass gas flow movement reaction functions.

FIGS. 14–19 are illustrative of embodiments of the invention that are now believed to be best able to capitalize upon utilizing the natural laws of physics and chemistry as applied to what is believed to be the most effective method for generating higher gauss strength magnetic oxygen gas and a steadystate stream of purifying multivalent oxygen ion allotropic gas along with a lesser amount of hybrid resonance ion forms of ozone gas, from atmospheric oxygen, with the least amount of electrical energy input required. The term "multivalent" has been defined hereinbefore.

It is a major function and object of the invention to minimize external electrical power input requirements to generate both magnetic oxygen and the multivalent ionized oxygen employed by the present invention; thus, it is a feature of this invention that a low power requirement not exceeding 30 watts is an operational response function that is directly proportional to invention embodiments as being reresentative of the best mode design criteria that will best interface with the natural physics and chemistry oxygen magnetization and gas low oxygen ionization phenomenon. Academic scientific evidence both in physics and chemistry has well established the difference in magnetic moment potential that naturally occurs between the nitrogen gas fraction of atmospheric air and the oxygen gas fraction of atmospheric air to represent a substantial difference in the magnetic flux densities and magnetic induction field characteristics between embient nitrogen and oxygen. At ambient temperatures the magnetic moment of atmospheric oxygen gas is reported at $+3449$ (in $10^{-6}$ cgs units) while contrastingly the magnetic moment of atmospheric nitrogen gas is $-12.0$ (in $10^{-6}$ cgs units). Applying the Magnet Industry gauss strength (cgs unit of magnetic induction or flux density) conversion formula of Gauss/oersted is equal to magnetic moment divided by one, then natural occurring atmospheric oxygen exists in ambient air with a measurable magnetic induction strength of $+0.003$ gauss whereas natural occurring nitrogen exists in ambient air without possessing any magnetic flux density characteristics whatsoever having a magnetic induction strength of $-0.000012$ gauss. Therefore, atmospheric oxygen gas is paramagnetic in behavior being that oxygen molecules possess sufficient gauss magnetic induction strength to become accelerated in molecular collision frequency, deflected stressed, and concentrated when atmospheric oxygen is passed through an externally applied magnetic energy cell zone whereas atmospheric nitrogen gas possesses virtually neutral gauss magnetic induction strength and passes through an externally applied magnetic energy cell zone in an unchanged and non-deflected manner—i.e., atmospheric oxygen gas being naturally paramagnetic, is capable of being magnetized to a higher order of magnetic reactivity in an external magnetic field.

Further, it is a known law of Physics and Electricity that a magnetic particle moving at right angles and perpendicular through the magnet lines of force or flux density energy zone of a surrounding and stronger magnetic induction field strength will experience physical particle stress along while developing some minute generation of electrical potential release. The FIGS. 14-19 embodiment disclosure identifies the manner the invention is capable of providing the multiple magnetic induction field energy cell zones whereby passing atmospheric paramagnetic oxygen gas molecules become physically stressed within induction field magnetic lines of force with a resulting molecular acceleration in both the vibrational and rotational energy level and collision frequency increase of the gaseous oxygen molecules; accelerated molecular movement speed cuts magnetic lines of force rapidly and causes successive and continuous release of small abvolt quantities of electrical potential.

FIG. 14 is a front perspective view of the preferred generator cabinet enclosure housing in accordance with the purpose to generate multivalent oxygen ion (magnetic and ionized oxygen) gas. The generator cabinet 240 including its illustrated top and bottom walls, side walls, and rear or back wall, and cabinet front cover 241, forms a quadrilateral boxlike enclosure structure defining a fluid flow chamber that contains the magnetic energy cell zones. Electrical wiring boxes on either side wall of the cabinet are formed by covers 242 suitably removably mounted on the respective side walls 242A that are integral with the cabinet 240 and in circumambient relation about the respective side boxes. The cabinet components 240, 241, 242 and 242A are constructed of a suitable highly inert and noncombustible polybutylene thermoplastic material which is custom injection molded to the desired dimensions. Cover 241 is sealed to cabinet 240 with a rectangular flat neoprene gasket 243 (see FIG. 14) that provides a 100% air tight vacuum seal when cover 241 and gasket 243 are drawn against cabinet 240 by using eight 10-32 self tapping stainless steel screws 244. An additional four self tapping screws 244 are used to tightly secure the two wiring side covers 242 against the two side wiring box openings of cabinet 240 that are defined by the respective walls 242A, as will be seen. Cabinet 240 is formed to define the atmospheric oxygen transforming air flow way or corridor arrangement contemplated by the present invention.

Dirt, oil and dust particles are filtered out of the entering atmospheric air flow by the use of commercially available polyester fiber filter pads 102 (similar to pads 102 of FIG. 6) that are located and fastened in two positions within the circular plastic filter pad holders 245 (see FIG. 15) on the cabinet cover 241. Each air filter pad holder 245 is located on the perpendicular axis centerline traversing through the center of energy cell Zone "A" and energy cell Zone "B" as indicated in FIG. 17, with the respective centermost energy cell locations being marked within the showing of the generator cabinet 240 by the Ⓧ location marks of FIGS. 15, 17 and 19. FIG. 14 shows a brass compression fitting 246 which is secured at the center point location of the cabinet cover 241, with a ½" diameter flexible polyethylene tubing 247 shown fitted to compression fitting 246 for the purpose of exerting an external vacuum suction air flow to draw upon the content of the internal space of cabinet 240 and cover 241 sealed enclosure, for effecting dispersion of same in the water to be treated, as for instance, in accordance with said U.S. application Ser. No. 645,400, filed Aug. 29, 1984 (the entire disclosure of which is incorporated herein by this reference), or, in accordance with the showing of FIG. 5.

As an extension of the external vacuum suction draw, FIG. 15 illustrates the inside front cover 241 center location point where a suction extension plastic tee assembly 248 is fitted and secured to the protruding brass fitting 246 in leak free relation thereto for the purpose of extending the vacuum suction ports Ⓨ to either side of the inside centermost location within the cabinet enclosure 240. FIG. 17 illustrates the position of the vacuum suction air flow draw from the cabinet to be located at points Ⓨ approximately equal-distant between energy cell Zone "A" and energy cell Zone "B"; these Ⓨ location positions represent the true cabinet center point from which the generated multivalent oxygen gas ions (and unreacted nitrogen gas) is vacuum withdrawn from the cabinet enclosure in accordance with this embodiment.

FIG. 15 is an enlarged perspective view showing (among other things) the inside components of the generator of this embodiment, indicating the location of commercially available square block permanent ceramic magnets 249 that are located within the cabinet 240 at the cabinet corners, and are mounted at 45° angles within magnet mount rails 250 at each cabinet corner quarter point location; an additional two similar magnets 249A are mounted within cabinet 240 in plastic mount holders 250A and one additional magnet block 249B mounted in plastic mount magnet holder 250B. FIGS. 15, 16, 18 and 19 illustrate these magnets in the form of 3 inch square custom magnetized permanent block magnet assemblies in which each is a commercially available strontium carbonate and iron oxide (ceramic) composition and magnetized with multi-polar or four pole magnetic field configuration that has been applied to each individual permanent ceramic magnet or magnet block 249. FIGS. 16 and 18 show each permanent ceramic magnet block 249 as having been individually custom magnetized to possess two magnetic North poles 251 and two magnetic South poles 252. FIG. 16 represents a fragmental corner section view of the side by side arrangement placement of two of the multi-polar permanent magnet blocks 249, oriented so that the North pole 251 of one magnetic block 249 is adjacent to and repelling the North pole 251 of the other magnet block 249, with each of the four corners of the generator cabinet 240 showing the identified 45° mounted placement of the respective block magnet assemblies each comprising two magnet blocks 249 with the orientation of like magnet poles being adjacent to and repelling one another (see FIG. 15).

Magnet holders 250A are suitably screw mounted in the rear or back wall of cabinet 240 in leak free relation thereto for disposing them in the relatibe positions indicated in FIGS. 15, 17 and 19.

FIGS. 15, 16, 18 and 19 indicate that each individual multi-polar permanent magnet block 249 has a center demagnetization opening or aperture 253 which exists as a circular hole through the magnet block 249 and represents an approximate area of opening equal to about 20% of the total surface area of the magnet block 249. The 20% open area of magnet block 249 is critical to affect the disrupting of the simultaneous center to center contacting of the two North magnetic poles 251 and the two South magnetic poles 252 and therefore disrupts any magnetic lines of force polar short-circuiting and cancellation affect across the contact block 249 center mass point and further prevents any demagnetization and declining of magnet field strength at the individual poles 251 and poles 252.

The gauss magnetic flux density field strength of each 3 inch square multi-polar permanent magnet block 249 averages 4,000 gauss strength across the block surface when in an unmounted position to any steel backing plate; as shown in FIGS. 15–19, each individual corner magnet block 249 is magnetically attached to a plate formed from magnetic material, as for instance, a 3/16" thick carbon steel plate 254 which acts both as a magnet backing and mounting and slides into and mounts within the generator enclosure cabinet 240 corner magnet slide rails 250 (see FIG. 17), and thereby positions the multi-polar permanent magnet block 249 at the indicated 45° corner angulation facing inward to the interior void space of the cabinet enclosure 240. FIGS. 16 and 18 illustrate each magnet backing plate 254 to also be formed with a ½" diameter center demagnetization hole opening 255 which works in conjunction with the respective individual multi-polar permanent magnet block 249 center demagnetization hole openings 253 to break any additional internal mass cross connecting lines of magnetic force within the mass center point of the steel backing plate 254 (the respective magnet openings 253 are aligned with the respective plate openings 255). The further combining effect of magnet block 249 demagnetization hole 253 and the magnet backing plate 254 demagnetization hole 255, along with the flat surface to surface contact between block and plate is to reverse and cancel the underside magnetic lines of force that exit along the interface contact surfaces between the mass of the respective magnet blocks 249 and the mass of the attracting contact surface of backing plate 254 to which the respective magnets 249 are applied, so that the greatest majority of the magnetic flux density energy contained within the internal mass of each multi-polar permanent magnet block 249 is now reversed through the mass of the magnet block and directionally pointed outward and away from the open flat magnet block multi-polar exposed or front surface—i.e., the "reversing and cancelling effect" exerted upon internal magnetic lines of force and flux densities within the individual ceramic magnet blocks 249 internal mass forms them into one-way field multi-polar directional magnets.

FIG. 19 diagrammatically and fragmentically illustrates the directional field magnet lines of force, of the resulting one way field multi-polar directional magnets, traversing in a back and forth pattern across the open void air space 256A of the cabinet energy cell Zone "A" and between the multi-polar magnetic surfaces of the ceramic magnet block-plate assemblies 249,254, and between the multi-polar surfaces of the magnets 249A. FIG. 19 is of course, only a planar drawing representation supplied for a better understanding of the invention and is largely diagrammatic and fragmental in nature to avoid, as in the case of FIG. 2, an undue confusion of lines. Also involved are flux density magnetic lines of force that exist completely around and across the open void air space 256A of energy cell Zone "A" in an enveloping 360° rotational or rotating directional pattern that in shape is quite similar to the crosswise and circular magnetic lines of flux energy zone corridor 36 (magnetic cell envelope), illustrated in FIG. 2. The incoming atmospheric oxygen air flow of FIG. 2 enters the magnet lines of force air space magnetic corridor at the intake end of corridor 36 and travels longitudinally, rectilinearly, and parallel with, the corridor center-line axis through the corridor flux density force fields in a substantially laminar flow and exits out the opposite, outflow, corridor end. By comparison, FIG. 19 represents what is now believed to be the best mode magnetic energy reaction cell arrangement in which the incoming paramagnetic (+0.003 gauss strength) atmospheric oxygen gas flow enters the mid-point center location (point Ⓧ of the magnetic energy cell Zones A and B and is caused to spin in a circular and rotational hurricane type, turbulent flow, pattern, as indicated by FIG. 17, from the respective entry points Ⓧ , as the paramagnetic oxygen gas molecules are inter-reacted with and are drawn into the enveloping magnetic lines of force of the respective multi-polar magnet energy cell Zones A and B—i.e., the inter-reacting paramagnetic oxygen gas molecules rotating into the center of the respective energy cells experiences repeat contact in the cutting of magnetic lines of force enveloping the respective energy cell boundaries; oxygen molecules are attracted and held back and are "multi-pass" concentrated in each energy cell for prolonged energy contact before being pulled out of the respective energy cell zone boundaries, and thus the cabinet chamber, by the vacuum suction draw on the generator chamber that establishes the passing air flow at the cabinet air flow exit point Ⓨ .

FIG. 17 defines a front elevational view of the cabinet 240, without cover, exposing the fluid flow chamber thereto, in which the lower half energy cell Zone "A" air flow void area 256A and the cell "A" associated embodiment are shown located within the cabinet chamber spaced from the upper half energy cell Zone "B" air flow void area 256B and the cell "B" associated embodiment. The energy cell Zone "B" magnetic lines of force flux density pattern is basically similar to magnetic lines of force field pattern that is diagrammatically represented in the FIG. 19 energy cell Zone cell "A" magnetic force field illustration. A distinct difference is involved between the cell Zones A and B in that in the cell Zone A the near oppositely located magnet blocks 249A shown in the FIG. 17 cell Zone "A" illustration, which attract and pull the zonal magnetic lines of force field in a 360° encircling pattern around the ultraviolet electron-volt emitting lamp 260, upwardly of the cabinet chamber and toward the center of same, have been replaced in the Zone cell "B" arrangement by employing a single multi-polar permanent ceramic magnet block 249B, that has approximately twice the flux density four pole field strength that either of the two magnet blocks 249A used in Zone cell "A" have, and that also attracts and pulls the Zone cell "B" zonal magnetic lines of force downwardly of the cabinet and toward the center of same, in an encircling 360° pattern around a screwable (or screwably mounted) U-tube ultraviolet electron-volt emitting lamp 259, in a general magnetic lines of force pattern that is similar to that of Zone cell "A". Magnet 249B is mounted on lamp 259 by being slipped over same, as by the passing of the lamp U-tube structure through the magnet 249B center demagnetization hole opening 253, with the magnet 249B being suitably fixedly mounted on lamp 253 (via suitable plastic mount holder 250B) approximately one-fourth of the way inward from the terminal end of lamp 259.

FIG. 18A is a plan view of a three inch diameter, single, circular, multi-polar permanent ceramic magnet 257 custom magnetized to possess the same quad-sectioned two North poles 251 and two South poles 252 as the three inch square permanent ceramic magnets 249, with the mounting of the permanent circular magnet 257 on and about lamp 259, as shown in FIG. 17, being effected in any suitable manner, as by receiving the lamp 259 through its center opening demagnetization hole 253, with magnet 257 snugly filling same and being snugly slid over thereupon to the screwable circular socket end of lamp 259 and being securely fixed to same in any suitable manner. FIGS. 15 and 17 indicate the location of the circular permanent ceramic multi-polar magnet 257 as attached to and mounted on the screwable electron-volt emitting lamp 259, magnet 257 being mounted at the juncture point where lamp 259 protrudes out of the receiving lamp connection socket 258. Socket 258 is suitably anchored to the near magnet 249 at that corner of the cabinet, aligned with that magnets center aperture 253. The combining effects of permanent ceramic magnet 257 and permanent ceramic magnet 249B further enhances the strength of the surrounding 360° magnetic lines of force field "envelope" that encapsules the electron-volt emitting lamp 259; additionally, said field strength combining effects of permanent magnets 257 and 249B assist to more evenly distribute the magnetic lines of force flux density field throughout the energy cell Zone "B" and relates air space voids 256B of the cabinet chamber.

It has been discovered by way of applying this embodiment of the invention to water purification and the resulting test results that the respective magnetic energy cell zone embodiments, individually and alone (though illustrated in FIGS. 14-19 as incorporated in the same cabinet 240, as energy cell Zones "A" and "B", with their associated magnets and three dimensional 360° enveloping magnetic lines of force flux fields), will magnetically activate and ionize atmospheric oxygen gas supplied to each such zone as atmospheric air flows through the individual cells in question. These cell Zones "A" and "B" each represent a separate flow way or corridor of the types disclosed in FIGS. 2-13, with each such flow way having its own inlet at Ⓧ and a common outlet at filling 246 and its tee assembly 248. Thus, for specific low capacity requirement situations, either the cell Zone "A" or the cell Zone "B" may be energized, instead of the joint activation illustrated. Alternately, the cabinet 240 may be arranged so that both cell zones are either of the "A" type, or they are of the "B" type, depending on specific requirements for specific applications.

Magnetically activated oxygen generated by the practice of this invention has been found to be more chemically reactive in water than is ambient atmospheric oxygen. It has been further established by way of test and operational data that magnetically activated atmospheric oxygen, as generated solely as a reaction function of ambient air flow passage through either of the respective magnetic energy cells Zone "A" or Zone "B", each in its own separate cabinet, or through the Zones "A" and "B" simultaneously, as in the embodiment of FIGS. 15 and 19, can be activated and/or excited in some manner that causes said "magnetic oxygen" to show substantially increased purifying chemical reactivity upon being diffused into contaminated water. The reasons causing the increased chemical reactivity of magnetically activated atmospheric oxygen are not completely understood; however, it is believed that the magnetic energy cell zone induction fields create stressful conditions on atmospheric oxygen gas paramagnetic molecules passing therethrough that cause rapid increase both in molecular collision frequencies and in accelerated deflected speed of rotational and vibrational molecular motion. Said stressful magnetic induction field conditions produce an intense energy cellular environment that creates a repeat contact (multi-pass) oxygen air flow which allows passing atmospheric oxygen to become more easily energy activated; it is conceivable that additional molecular stress is applied via the continual multi-pass repeat contact colliding of partially energy activated oxygen gas molecules with newly entering and incoming atmospheric oxygen gas molecules, and that these collisions will create a weakening affect upon the entering gas molecules thereby making entering oxygen molecules more receptive to additional magnetic and ionizing energy as transferred to them via catalyzing molecular impacts.

The magnetic particle induction laws of electricity and physics determine production of magnetic oxygen by way of practice of the invention since naturally occurring magnetic particles, such as paramagnetic oxygen gas molecules, will generate minute electrical impulse potential (abvolt electricity) as the passing paramagnetic molecular oxygen particles move perpendicularly through the stronger magnetic lines of force field of the surrounding three dimensional magnetic energy cell zones. The right angle cutting of the magnetic lines of force within the respective magnetic energy cell Zone "A" and Zone "B", as exerted by the passing air flow movement of paramagnetic atmospheric oxygen molecules, appears to impart some measurable release of small abvolt electrical potential that is absorbed under stress by some proportion of the passing atmospheric oxygen gas molecules and which results in an apparent electrical ionization affect thereupon passing oxygen gas molecules, and therefore produces slightly ionized (negatively charged) and magnetically activated oxygen gas molecules having a greater chemical activity when dissolved in water. It is conceivable that both the quantity and the chemical reactive intensity of magnetically ionized and magnetically activated oxygen gas could be increased by passing pure bottled oxygen gas through magnetic energy cells herein disclosed and/or greatly increased by applying and substituting suitably wired and electrically energized electro magnetic alternating current induction field magnets in place of the rod type permanent ceramic magnets 46 as described in FIGS. 2, 5 and 6 or by substituting comparatively shaped and suitably wired and electrically energized but otherwise similar electro magnets for the corner cabinet permanent ceramic magnets 249 illustrated in FIGS. 15, 17 and 19.

It has been demonstrated that alternating current electromagnets having approximately the same physical dimensions as the permanent ceramic magnets 249, which electromagnets are suitably wired, will produce energy cell Zone "A" or "B" magnetic induction field strength that is two to three times more intense than as produced by the unwound permanent ceramic magnets 249 disclosed in connection with the embodiment of FIGS. 14-19.

Specific water purification treatment applications in accordance with the embodiment of FIGS. 14-19 have shown that larger capacity alternate versions of the invention best mode arrangement where used solely as a magnetic oxygen gas generator device, will normally involve the useage of electrically powered induction field electromagnets in place of the hereindisclosed permanent ceramic magnet arrangement.

The increased purification treatment activity magnetically activated/ionized oxygen gas generated pursuant to the invention has been demonstrated by applying the magnetic energy cell design system of FIGS. 14–19 to the purification of various categories of contaminated waters—i.e., filtration enhancement purification and coagulation of both dissolved solids and fine suspended solids contaminants has been successfully demonstrated by applying the magnetic oxygen gas stream generated pursuant to this invention to aquarium water, dairy cleaning water, industrial cooling water, and swimming pool waters, and it is further believed that many additional medical applications exist in the application of such magnetic oxygen gas to provide relief of patient respiratory stress syndroms.

FIGS. 15, 17 and 19 show the location of the two low wattage oxygen photolysis electron-volt emitting lamps 259 and 260, which, respectively, are centrally positioned, to provide a cocurrent energy "couple" within the magnetic energy cell Zone "A" and magnetic energy cell Zone "B", respectively; each lamp 259 and 260 is of the indicated commercially available types, and requires less than 30 watts power, and yields oxygen ionizing electron-volt emissions in the short wavelength ultraviolet range. An energy couple, as defined in the 62nd Edition, 1981-1982 Handbook of Chemistry and Physics, represents a three dimensional intermeshing and interaction of energy forces as supplied cocurrently together in the same physical realm. The invention contemplates the practice of the application of two (or more) energy field couples as illustrated in FIGS. 17 and 19, which illustrate the magnetic lines of force of energy cell Zone "A" and magnetic energy cell Zone "B", creating magnetic induction energy fields that traverse the zonal air space areas 256A and 256B, respectively, of the cabinet chamber, to produce three dimensional energy intermeshing and interaction with the oxygen ionizing electron-volt emissions of each centermost zonally located oxygen photolysis lamp 260 and 259, respectively.

FIG. 19 illustrates energy couple bombardment of the magnetic lines of force energy fields released from the peripheral mounted permanent ceramic magnets 249 and 249A across the energy zone air space 256A (of the cabinet air flow chamber) and shows for illustrative purposes the electron-volt energy couple emissions radiating perpendicularly away from the oxygen photolysis lamp 260 along one radius of same (shown in dashed lines that are coplanar related on such radius along the length of, and on either side of, lamp 260) to be intermeshing with the magnetic lines of force of the cell "A" zonal induction field. Simultaneously, both such energy fields couple together and interact upon atmospheric oxygen molecules entering the zone center, of cell Zone "A", at point $\bigotimes$, to produce both magnetically activated oxygen and ionized oxygen multivalent ion forms. In the process of the two energy field couple interactions, it is believed that the magnetic induction field energy imparts a pre-treatment energy stress upon the entering atmospheric oxygen molecules, and catalyzes the molecular multi-pass air flow movement of oxygen so that said entering oxygen gas molecules absorb excess magnetic energy stress and therefore become much more receptive to accepting emitted free electrons from the ionizing electron-volt radiations being continually released from the oxygen photolysis lamp 260; this also occurs at cell Zone "B" with regard to lamp 259. It is probable that the primary reaction sequence occasioned by the practice of the invention involves the production of magnetic oxygen within the respective energy cell Zones "A" and "B", while there also exists secondary and tertiary orders of unknown reaction sequence also simultaneously occurring in the respective energy cells. The dual energy field couple catalyzes and reinforces simultaneous interactions of both magnetic energy and electron-volt ionizing energy to produce various secondary and tertiery multivalent oxygen ion charge groups of singlet molecular oxygen and resonance ions that are both single and double bonded while also producing higher magnetic energy oxygen molecules with slight negative charge. FIG. 20 illustrates what the Applicants suggest is the sequence for the reaction in each energy cell Zone "A" and "B", as well as in the other reaction cells herein disclosed (FIGS. 3–13), as to the production of magnetic oxygen and multivalent oxygen ion, primary—secondary—tertiary reaction, byproduct, formations that individually possess excess negative charge, which when transferred into water, is released to the solvent as solvated or free "scavenger" electrons.

The oxygen photolysis lamps 260 and 259 are, more specifically, of the commercially available low pressure mercury vapor design type and, as employed, are to be specifically matched to the commercially available custom lamp ballast 263 step-down transformer electrical circuit design employed for each such lamp, as diagrammatically illustrated in FIG. 19, and as is conventional for their proper functioning as mercury vapor, electron-volt, ultra-violet light producing lamps. The individual electron-volt emitting lamps 260 and 259 electrical requirements preferably are in the range of 10–15 watts electrical power consumption; the total power input to the cabinet 240 need not exceed a maximum of thirty watts combined energy cell power consumption, which represents pennies per day, cost effective, electrical operation costs The respective oxygen photolysis electron-volt emitting lamps 260 and 259 are each preferably electrically powered by the indicated custom design autoformer/choke ballast transformer 263, and suitable electrical circuitry therefor, as diagrammatically illustrated in FIG. 19. While these lamps 259 and 260 may be electrically wired and powered for operation, in the manner described, in any conventional way, a suitable electrical connection arrangement therefor is diagrammatically illustrated and will be briefly described. Transformer 263 electrical connections to the electron-volt oxygen photolysis lamp 260 of cell Zone "A" are made in any suitable manner, as by suitably mounting four stainless steel contact springs 261B to the inside side walls of the cabinet 240 at the center location of energy cell Zone "A", with the lamp 260 electrical connection pins being inserted, electrical contact style, into the respective stainless steel contact springs 261B. In the specific arrangement shown, two of the lamp 260 mount springs are electrically connected to the lamp starter 262 via the connecting wire 261A closed circuit loop while the transformer ballast 263 is connected to the remaining two lamp 260 mount springs by the connecting wire 261B closed circuit loop; as shown in FIGS. 17 and 19, the closed electrical circuit connecting wires 261A and 261B suitably pass through the cabinet enclosure 240, between the two side electrical wiring boxes, formed by cover 242 and side walls 242A, through the plastic tubular wireway conduit 264 which is mounted in sealed relation to the cabinet 240 inside side wall surfaces. Referring to FIG. 17, the electron-volt oxygen photolysis lamp 259 is suitably and similarly wired to a similar lamp ballast 263 step-down transformer with the same circuitry as lamp 260, but has a porcelain lamp base screwable socket 258 providing the electrical connections to lamp 259, the lamp base socket 258 is suitably rigidly mounted in place upon the upper left hand corner cabinet outer magnet 249 and magnet backplate 254, as previously indicated.

The activated oxygen gas stream that is generated by the practice of the invention is, as has been indicated, magnetically and electron-volt accelerated into higher vibrational-rotational energy, magnetic, and electrically active levels of highly water reactive magnetically charged and negatively charged oxygen ions. The generated reactive oxygen gas flow, in the practice of the invention comprising an accelerated energy charged oxygen magnetically activated and ionized negative ion gas stream, is conveyed into and becomes interspersed dissolved and saturated within the contaminated water to be purified by using a continuous contact mode "retention" application. These generated oxygen magnetic-electrically reactive negative ions are water dispersed by their inherent electrical attraction into and among the polar charged water molecules and therein release solvated or free electrons into the water which in turn becomes further electrostatically attracted to contaminants and solids within the water flow; the presence of free scavenger solvated electrons results in purification treatment results that continuously oxidizes, coagulates, descales, disinfects and enhances filtration, vis-a-vis the presence of the injected highly reactive dissolved oxygen gas magnetic and allotropic multivalent oxygen ions.

It will be appreciated from a reading of the foregoing taken in light of the application drawings that the invention provides a number of significant advantages and improvements several of the more important of which are as follows:

The invention contemplates that the agent for purifying water is to have as its source the atmospheric air, namely paramagnetic atmospheric oxygen, with the atmospheric oxygen being processed as part of an atmospheric or ambient air flow through the Applicant's special reactor cells, and specifically the flow way or energy zone corridors defined by same, whereby atmospheric oxygen is treated by way of the Applicant's special pagnetic fields and photolysis lamp(s) arrangements to transform atmospheric oxygen to highly active and stable magnetic oxygen and multivalent oxygen allotrope ions that, by the dipole nature of water, when diffused into the water to be treated in one of the manners hereindisclosed, even in the relative low feed rates hereinafter referred to, achieve rapid saturation of the liquid to be treated with the Applicant's magnetic-ionized oxygen, or oxidant gas treating agent which is thus brought into correspondingly broad purifying relation with substances that are oxidizable or coagulatable and are either in solution or entrained in the water flow. The magnetic oxygen and multivalent oxygen (oxidant) gas purification provided by the invention serves the same purpose as the various chemical compounds currently available, but avoids the problems of having these various types of chemical compounds in the water, their various side effects, and the like. All matter, including matter which is oxidizable, if contained in the water being treated, is subject to the oxidizing and/or coagulating action of the Applicant's multivalent oxygen/-magnetic oxygen gases. The surface tension of the water is also reduced to permit settling out of solids that are not in solution but are entrapped perhaps in fine form in the water molecule bonds. The application of the invention is especially suited for disinfection, descaling, detoxification, and filtration enhancement coagulation, of water.

Special aspects of the invention are that the source of the invention agent for purifying water, namely ambient atmospheric air, is unlimited, and, as indicated, the presence in the Applicants' oxidant gas generators of the magnetic field or fields makes the flow way or energy zone corridor self cleaning for the length of the photolysis lamp or lamps employed. Thus, the Applicants' generator magnetic-multivalent ion (oxidant) gas supply function continues with no decrease and unabated during the entire period of operation due to the continual and unabated source of supply of atmospheric air, and the self cleaning action the Applicants' magnet field have on the photolysis lamp.

In terms of results, the application of the Applicants' oxidant gas to the water being treated has been found to reduce surface tension in the water, by breaking of the hydrogen bond between water molecules, and this enhances descaling and agglommeration of colloidal solid particles into larger size (for settling and filtering out), as well as effects oxidative decontamination of organic debris and disinfection of bacteria, fungus, and virus. Also, pH stabilization and buffering is effected due to formation of hydroxlation $(OH)^-$ ion byproducts created by the release of free electrons into the water solvent being released by the dispersed magnetic oxygen and multivalent oxygen ions from oxidation reactions. These agglommeration and pH stabilization and buffering effects are believed to be new for water treatment developments as a result of the solvated electron phenomenon.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. An oxidant gas generator for receiving an air flow from the ambient air, converting atmospheric oxygen contained in the ambient air flow to oxidant gas in the form of ionized gaseous oxygen allotropes, and discharging the air flow therefrom for application to liquids to be treated thereby, on a uniform and uninterrupted basis, said generator comprising:

a housing defining a fluid flow chamber formed by a non magnetic material and forming an air flow way for the ambient air flow having an inlet and an outlet therealong, with said inlet being open to the ambient air, said air flow way between said inlet and said outlet having a site for effecting said conversion of atmospheric oxygen of the ambient air flow, said site including:

magnetic means of fixed intensity defining multiple north-south magnetic polar relations having varient orientations for forming multiple magnetic flux fields of which the magnetic lines of force therefrom are concentrated within and are interlaced across and along the air flow way at said site, and an elongate mercury vapor photolysis lamp mounted to be disposed in said site within said flow way and said magnetic flux fields for generating ionizing ultraviolet light therealong and substantially 360 degrees thereabout, means for electrically energizing said lamp for enveloping said flux fields and said lines of force thereof with ultraviolet light electron-volt energy emissions from said lamp, and means for inducing flow of ambient air from the atmosphere through said flow way, whereby when said lamp is energized by said energizing means, said lamp effects said ultraviolet light electron-volt energy emissions radially about said lamp in enveloping relation to said flux fields, and on said flow of ambient air from the atmosphere being induced through said ambient air flow path and said site thereof, at said site atmospheric oxygen of the ambient air flow, as such atmospheric oxygen moves through said site, is subject to conversion to ionized gaseous, oxygen allotropes of highly energized characteristics, under the cooperative effects of said flux fields enveloped by said ultraviolet light electron-volt energy emissions from said lamp, to the exclusion of the air flow nitrogen content, for discharge as said oxidant gas as part of the air flow discharge from said air flow way outlet, said magnetic means flux fields being oriented in magnetically acting relation to said lamp for maintaining said lamp free of foreign material, ultraviolet light blocking, buildups on said lamp, and effecting concentration of said oxidant gas, of the ambient air flow, at said site for prolonging conversion treatment time of the atmospheric oxygen content of said air flow therethrough for increased oxidizing potential of said oxidant gas contained in the air flow discharge from said air flow way outlet.

2. The oxidant gas generator set forth in claim 1 wherein:

said magnetic means flux fields are defined by a plurality of elongate magnet devices each comprising a casing formed from a non magnetic material and containing therealong a series of elongate permanent magnets in spaced apart, longitudinally aligned, alternating north to south pole relation, with consecutive magnets of the respective casings being separated by non magnetic bodies, said casings being positioned and oriented relative to said site to provide said site interlacing lines of force.

3. The oxidant gas generator set forth in claim 1 wherein:

said ambient air flow inducing means comprises means for mechanically inducing the air flow through said flow way.

4. The oxidant gas generator set forth in claim 1 wherein:

said ambient air flow inducing means comprises said flow way outlet being disposed above said flow way inlet, said lamp heating the air within said flow way site to effect convection flow of said air flow through said ambient air flow way.

5. The oxidant gas generator set forth in claim 1 including:

means for recycling a portion of the ambient air flow from said outlet back into said way at said site.

6. The oxidant gas generator set forth in claim 1 wherein:

said chamber is generally parallelepiped in configuration, with said magnetic means flux fields being formed by at least one permanent magnet device mounted in said chamber.

7. The oxidant gas generator set forth in claim 1 wherein:

said chamber is generally cylindrical in configuration, with said magnetic means flux fields being formed by at least one elegontate permanent magnet device mounted to extend longitudinally of said chamber, said lamp extending longitudinally of said way and being substantially centered within said chamber.

8. The oxidant gas generator set forth in claim 1 including:

means for interspersing the ambient air flow from said outlet into liquid to be treated thereby, including conduit means connected between said outlet and said interspersing means.

9. The oxidant gas generator set forth in claim 1 wherein:

said magnetic means flux fields are defined by a plurality of magnets of planar quadrilateral configuration of which said magnets are disposed adjacent said air flow way inlet and said lamp in planes that extend crosswise of said air flow way, said magnets each having a planar underside and a magnetic flux field forming side, with each said magnet having its underside magnetically adhered to a plate of magnetic material mounted in said chamber, said magnets each defining multiple poles thereabout and being formed to define a centrally located demagnetization aperture, with said magnetic flux field forming sides of said magnets facing said lamp and being oriented within said flow chamber to provide said site interlacing lines of force.

10. The oxidant gas generator set forth in claim 1 wherein:

said air flow way extends generally longitudinally of said lamp.

11. The oxidant gas generator set forth in claim 1 wherein:

said air flow way extends generally crosswise of said lamp.

12. The oxidant gas generator set forth in claim 1 wherein:

said ambient air flow inducing means includes means for exposing said ambient air flow way to a source to vacuum at said ambient air flow way outlet.

13. The oxidant gas generator set forth in claim 1 wherein:

said magnetic means and said lamp are oriented to form said air flow way in substantial parallelism to said lamp.

14. The oxidant gas generator set forth in claim 1 wherein:

said magnetic means and said lamp are oriented to form said air flow way crosswise of said lamp.

15. The oxidant gas generator set forth in claim 14 wherein:

said housing forms a second air flow way for the ambient air flow, said second flow way having its own inlet and an outlet that is common with said outlet, said second flow way including its own said site.

16. Apparatus for chemcial free water purification treatment utilizing atmospheric origin oxygen, said apparatus comprising:

a housing defining a fluid flow chamber formed by a non magnetic material and forming an air flow way for the ambient air flow having an inlet and an outlet therealong, said inlet being open to the ambient air, said air flow way between said inlet and said outlet having a site for effecting conversaion of atmospheric oxygen of the ambient air flow to oxidat gas in the form of ionized gaseous oxygen allotropes, said site including:

magnetic means of fixed intensity defining multiple north-south magnetic polar relations having varient orientations for forming multiple magnetic flux fields of which the magnetic lines of force therefrom are concentrated within and are interlaced across and along the air flow way at said site, and a mercury vapor photolysis lamp mounted to be disposed in said site within said flow way and said magnetic flux fields for generating ionizing ultraviolet light therealong and substantially 360 degrees thereabout, means for electrically energizing said lamp for enveloping said flux fields and said flux lines of force thereof with ultraviolet light electron-volt energy emissions from said lamp, and means for inducing flow of ambient air from the atmosphere through said flow way, whereby when said lamp is energized by said energizing means, said lamp effects said ultraviolet light electron-volt energy emissions radially about said lamp in enveloping relation to said flux fields, and on said flow of ambient air from the atmosphere being induced through said ambient flow path and said site thereof, at said site atmospheric oxygen of the ambient air flow, as such atmosphere oxygen moves through said site, is subject to conversion to ionized, gaseous, oxygen allotropes of highly energized characteristics, under the cooperative effects of said flux fields enveloped by said ultraviolet light electron-volt energy emissions from said lamp, to the exclusion of the air flow nitrogen content, for discharge as said oxidant gas has part of the air flow discharge from said air flow way outlet, said magnetic means fiux fields being oriented in magnetically acting relation to said lamp for maintaining said lamp free of foreign material, ultraviolet light blocking, buildups on said lamp, and effecting concentration of said oxidant gas, of the ambient air flow, at said site for prolonging conversion treatment time of the atmospheric oxygen content of said air flow therethrough for increased oxidizing potential of said oxidant gas contained in the air flow discharge from said air flow way outlet, and means for interspersing the ambient air flow from said outlet, including said oxidant gas, into the water to be treated including:

means for diffusing the air flow into the water to be treated, and conduit means connected between said outlet and said diffusing means for conducting the air flow from said way to said diffusing means.

17. The apparatus set forth in claim 16 wherein:

said magnetic means flux fields are defined by a plurality of elongate magnet devices each comprising a casing formed from a man magnetic mateial and containing therealong a series of elongate permanent magnets in spaced apart, longitudinally aligned, alternating north to south pole relation, with consecutive magnets of the respective casings being separated by non magnetic bodies, said casings being positioned and oriented relative to said site to produce said site interlacing lines of force.

18. The apparatus set forth in claim 16 wherein:

said ambient air flow inducing means comprises means for mechanically inducing the air flow through said flow way.

19. The apparatus set forth in claim 16 wherein:

said ambient air flow inducing means comprises said flow way outlet being disposed above said flow way inlet, said lamp heating the air within said flow way site to effect convection flow of said air flow through said ambient air flow way.

20. The apparatus set forth in claim 16 including:

means for recycling a portion of the ambient air flow from said outlet back into said way at said site.

21. The apparatus set forth in claim 16 wherein:

said chamber is generally parallelepiped in configuration, with said magnetic means flux fields being formed by at least one permanent magnet device mounted in said chamber.

22. The apparatus set forth in claim 16 wherein:

said chamber is generally cylindrical in configuration, with said magnetic means flux field being formed by at least one elongate permanent magnet device mounted to extend longitudinally of said chamber, said lamp extending longitudinally of said way and being substantially centered within said chamber.

23. The method of treating a flow stream of ambient air to convert atmospheric oxygen in same to ionized gaseous oxygen allotrope oxidant gas that remains in the air flow stream, which method comprises:

establishing a gas flow path for the air flow stream and an ionized oxygen allotrope forming site in same that includes multiple magnetic flux fields of fixed intensity characterized by multiple north-south magnetic polar relations having varient orientations of which the magnetic lines of force therefrom are concentrated within and are interlaced across and along the path at the site, enveloping the flux fields from a source within the flow path at the site with ultraviolet wave length electron-volt emissions having oxygen ionizing characteristics, continuously passing the ambient air flow stream from an ambient air source through the gas flow path including said site while using the magnetism of said flux fields to concentrate atmospheric oxygen in the flow stream at the site and shielding the electron-volt emissions source from blockage, converting at said site the atmospheric oxygen of the flow stream passing therethrough into oxygen allotrope ions by photo bombarding of same in the presence of said flux fields to form the oxidant gas of the air flow stream, while simultaneously passing the atmospheric nitrogen of the flow stream through the site free from chemical change, and continuously passing the flow stream, including the converted atmospheric oxygen in gaseous form, from the gas flow path.

24. The method of water purification treatment which includes the steps of claim 23 and thereafter, diffusing the flow stream into the water to be treated, whereby the resulting oxygen allotrope ions of the flow stream are attracted to the water molecules of the water by way of their dipole electrical nature and thence into oxidizing relation with foreign material in the water, to effect, using the converted atmospheric oxygen, reduction of the surface tension of the water and thereby enhancing agglommeration of colloidal solids therein for settling out therefrom, oxidizing the foreign material remaining in the water, and stabilizing and buffering of the water pH.

* * * * *